US010505771B2

(12) United States Patent
Yoshizawa et al.

(10) Patent No.: US 10,505,771 B2
(45) Date of Patent: Dec. 10, 2019

(54) APPARATUS, METHOD, AND PROGRAM

(71) Applicant: SONY CORPORATION, Tokyo (JP)

(72) Inventors: Atsushi Yoshizawa, Kanagawa (JP); Yukitoshi Sanada, Kanagawa (JP); Yuka Enjoji, Kanagawa (JP); Yuta Akai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/069,081

(22) PCT Filed: Nov. 16, 2016

(86) PCT No.: PCT/JP2016/083971
§ 371 (c)(1),
(2) Date: Jul. 10, 2018

(87) PCT Pub. No.: WO2017/126206
PCT Pub. Date: Jul. 27, 2017

(65) Prior Publication Data

US 2019/0020515 A1 Jan. 17, 2019

(30) Foreign Application Priority Data

Jan. 21, 2016 (JP) ................................ 2016-009626

(51) Int. Cl.
*H04L 27/26* (2006.01)
*H04L 5/00* (2006.01)
*H04L 25/03* (2006.01)

(52) U.S. Cl.
CPC .......... *H04L 27/2602* (2013.01); *H04L 5/001* (2013.01); *H04L 5/003* (2013.01); *H04L 25/03* (2013.01); *H04L 27/264* (2013.01)

(58) Field of Classification Search
CPC ...... H04L 5/001; H04L 27/2602; H04L 5/003
See application file for complete search history.

(56) References Cited

U.S. PATENT DOCUMENTS

2010/0189132 A1 7/2010 Fettweis et al.

OTHER PUBLICATIONS

Michailow, N. et al., "Generalized Frequency Division Multiplexing for 5th Generation Cellular Networks", IEEE Transactions on Communications, pp. 1-18.
International Search Report dated Feb. 7, 2017 in PCT/JP2016/083971, 2 pages.
Michailow, N. et al. "Generalized Frequency Division Multiplexing for 5th Generation Cellular Networks", IEEE Transactions on Communications, vol. 62, No. 9, Sep. 2014, pp. 3045-3061.

(Continued)

*Primary Examiner* — Kevin C. Harper
*Assistant Examiner* — Henry Baron
(74) *Attorney, Agent, or Firm* — Xsensus, LLP

(57) ABSTRACT

An apparatus that can make a success of demodulation on the reception side even if the restrictions on the resource setting are lifted. The apparatus includes: a processing unit configured to variably set at least any of a number of subcarriers or a number of subsymbols included in a unit resource including one or more subcarriers or one or more subsymbols, and set a filter coefficient that is applied in accordance with different rules which depend on whether the number of subsymbols included in the unit resource is an even number or an odd number.

11 Claims, 23 Drawing Sheets

(56) References Cited

OTHER PUBLICATIONS

Wei, P. et al. "Fast DGT-Based Receivers for GFDM in Broadband Channels", IEEE Transactions on Communications, vol. 64, No. 10, Oct. 2016, pp. 1331-1345.
Matthé, M. et al. "Generalized Frequency Division Multiplexing in a Gabor Transform Setting", IEEE Communications Letters, vol. 18, No. 8, Aug. 2014, pp. 1379-1382.
Farhang, A. et al. "Low Complexity GFDM Receiver Design: A New Approach", 2015 IEEE International Conference on Communications—Signal Processing for Communications Symposium, 2015, pp. 4775-4780.
"Waveform Candidates", Qualcomm Incorporated, 3GPP TSG-RAN WG1 #84b, R1-162199, Apr. 2016, pp. 1-26.

AMPLITUDE
FREQUENCY
1
0
π
−π
m=0
m=1
m=2
m=3

301
302
311
312
AMPLITUDE
FREQUENCY
$-\pi$
$\pi$
$\overline{-\pi}$
$\overline{\pi}$
m=0
m=1
m=2
m=3
$\overline{m=0}$
$\overline{m=1}$
$\overline{m=2}$
$\overline{m=3}$ 830
840
840
860
863
WIRELESS COMMUNICATION I/F
864
RF
864
RF
861
CONNECTION I/F
850
855
WIRELESS COMMUNICATION I/F
856
BB
856
BB
857
CONNECTION I/F
851
CONTROLLER
854
853
NETWORK I/F
852
MEMORY 900
916
915
912
WIRELESS COMMUNICATION I/F
914
RF
913
BB
906
CAMERA
907
SENSOR
908
MICROPHONE
917
909
INPUT DEVICE
911
SPEAKER
903
STORAGE
902
MEMORY
901
PROCESSOR
910
DISPLAY DEVICE
904
EXTERNAL CONNECTION I/F
919
AUXILIARY CONTROLLER
918
BATTERY

APPARATUS, METHOD, AND PROGRAM

TECHNICAL FIELD

The present disclosure relates to an apparatus, a method, and a program.

BACKGROUND ART

In recent years, as a representative of multicarrier modulation techniques (that is, multiplexing techniques or multiple access technologies), orthogonal frequency division multiplexing (OFDM) and orthogonal frequency division multiple access (OFDMA) have been put to practical use in various wireless systems. Application examples include digital broadcasting, a wireless LAN, and a cellular system. OFDM has resistance with respect to a multipath propagation path and can prevent the occurrence of inter-symbol interference caused by a multipath delay wave by employing a cyclic prefix (CP). On the other hand, OFDM has a disadvantage in that a level of out-of-band radiation is large. Further, a peak-to-average power ratio (PAPR) tends to increase, and there is also a disadvantage in which it is vulnerable to distortion occurring in transmission and reception apparatuses.

New modulation techniques capable of suppressing such out-of-band radiation which is a disadvantage of OFDM are emerging. These modulation techniques introduce a new concept called a subsymbol and can design a time and a frequency of a symbol flexibly by dividing one symbol into an arbitrary number of subsymbols. Further, these modulation techniques can reduce unnecessary out-of-band signal radiation by applying a pulse shaping filter to a symbol and performing waveform shaping, and the frequency use efficiency is expected to be improved. Further, the present modulation technology makes it possible to more flexibly set a resource by introducing a subsymbol, and thus serves as a means for expressing diversity that is going to be desired in the future.

These modulation techniques have various names such as universal filtered-OFDM (UF-OFDM), universal filtered multi-carrier (UFMC), filter bank multi-carrier (FBMC), and generalized OFDM (GOFDM). Particularly, since these modulation techniques can be regarded as generalized OFDM, they are also referred to as generalized frequency division multiplexing (GFDM), and this name is employed in this specification. A basic technology related to GFDM is disclosed, for example, in Patent Literature 1 and Non-Patent Literature 1.

CITATION LIST

Patent Literature

Patent Literature 1: US Patent Publication No. 2010/0189132A1

Non-Patent Literature

Non-Patent Literature 1: N. Michailow, et al., "Generalized Frequency Division Multiplexing for 5th Generation Cellular Networks," IEEE Trans. Commun., Vol. 62, no. 9, September 2014.

DISCLOSURE OF INVENTION

Technical Problem

In GFDM, it is possible to flexibly set subsymbol length and subcarrier frequency, that is, to set the number of subsymbols and the number of subcarriers in a unit resource. However, to make a success of demodulation on the reception side, this resource setting is substantially subjected to restrictions in some cases. Therefore, it is desirable to provide a mechanism that can make a success of demodulation on the reception side even if the restrictions on the resource setting are lifted.

Solution to Problem

According to the present disclosure, there is provided an apparatus including: a processing unit configured to variably set at least any of a number of subcarriers or a number of subsymbols included in a unit resource including one or more subcarriers or one or more subsymbols, and set a filter coefficient that is applied in accordance with different rules which depend on whether the number of subsymbols included in the unit resource is an even number or an odd number.

In addition, according to the present disclosure, there is provided an apparatus including: a processing unit configured to set a filter coefficient in accordance with different rules, the filter coefficient being applied to a signal that is transmitted by variably setting at least any of a number of subcarriers or a number of subsymbols included in a unit resource including one or more subcarriers or one or more subsymbols, the different rules depending on whether the number of subsymbols included in the unit resource is an even number or an odd number.

In addition, according to the present disclosure, there is provided a method including: variably setting, by a processor, at least any of a number of subcarriers or a number of subsymbols included in a unit resource including one or more subcarriers or one or more subsymbols, and setting a filter coefficient that is applied in accordance with different rules which depend on whether the number of subsymbols included in the unit resource is an even number or an odd number.

In addition, according to the present disclosure, there is provided a method including: setting, by a processor, a filter coefficient in accordance with different rules, the filter coefficient being applied to a signal that is transmitted by variably setting at least any of a number of subcarriers or a number of subsymbols included in a unit resource including one or more subcarriers or one or more subsymbols, the different rules depending on whether the number of subsymbols included in the unit resource is an even number or an odd number.

In addition, according to the present disclosure, there is provided a program for causing a computer to function as: a processing unit configured to variably set at least any of a number of subcarriers or a number of subsymbols included in a unit resource including one or more subcarriers or one or more subsymbols, and set a filter coefficient that is applied in accordance with different rules which depend on whether the number of subsymbols included in the unit resource is an even number or an odd number.

In addition, according to the present disclosure, there is provided a program for causing a computer to function as: a processing unit configured to set a filter coefficient in accordance with different rules, the filter coefficient being applied to a signal that is transmitted by variably setting at least any of a number of subcarriers or a number of subsymbols included in a unit resource including one or more subcarriers or one or more subsymbols, the different rules depending on whether the number of subsymbols included in the unit resource is an even number or an odd number.

Advantageous Effects of Invention

According to the present disclosure as described above, there is provided a mechanism that can make a success of demodulation on a reception side even if a restriction on resource setting is lifted. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
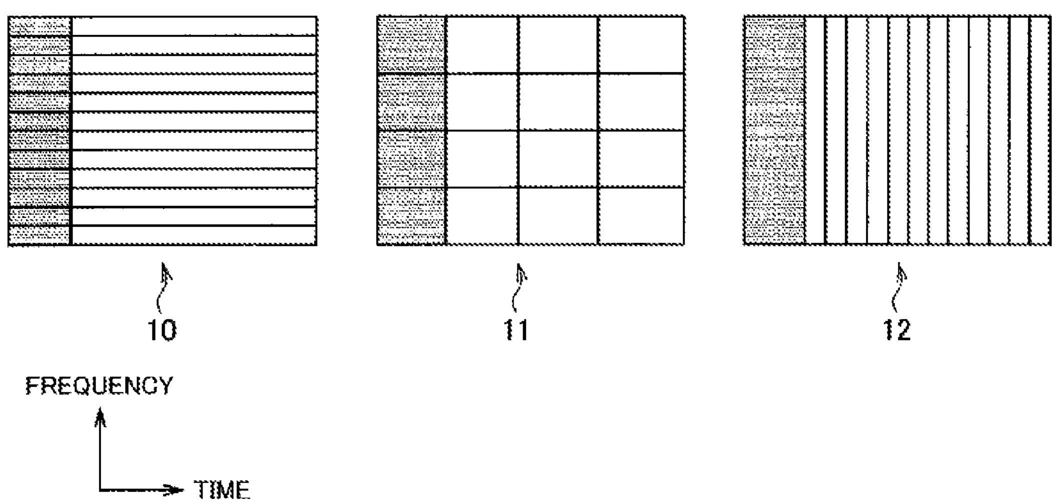
FIG. 1 is an explanatory diagram for describing a technique related to GFDM.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are cases in which elements having substantially the same functional configuration are distinguished by adding different letters after the same reference numeral. For example, a plurality of elements having substantially the same functional configuration are distinguished as terminal apparatuses 200A, 200B, and 200C as necessary. However, when it is not necessary to particularly distinguish a plurality of elements having substantially the same functional configuration, only the same reference numeral is attached. For example, when it is not necessary to particularly distinguish terminal apparatuses 200A, 200B and 200C, they are referred to simply as a "terminal apparatus 200."

Note that the description will proceed in the following order.

1. Instruction
1.1. GFDM
1.2. Technical problem
2. Schematic configuration of system
3. Configurations of each apparatus
3.1. Configuration of base station
3.2. Configuration of terminal apparatus
4. Technical features
4.1. Transmission process
4.2. Reception process
5. Simulation result
6. Application examples
7. Conclusion

1. INTRODUCTION

<1.1. GFDM>

First, GFDM will be described with reference to FIGS. 1 to 3.

FIG. 1 is an explanatory diagram for describing a concept of a symbol in GFDM. A reference numeral 10 indicates radio resources per symbol in OFDM. In the radio resources indicated by the reference numeral 10, one symbol interval is occupied by a single symbol, and a plurality of subcarriers are included in a frequency direction. Further, in OFDM, a CP is added to each symbol. A reference numeral 12 indicates radio resources of an interval corresponding to one symbol of OFDM in a single carrier frequency division multiplexing (SC-FDM) signal. The radio resources indicated by the reference numeral 12 are exclusively used by a single symbol over a carrier frequency, have a smaller symbol length than that in OFDM, and include a plurality of symbols in a time direction. A reference numeral 11 indicates radio resources of an interval corresponding to one symbol of OFDM in GFDM. The radio resources indicated by the reference numeral 11 have an intermediate structure between the radio resources indicated by the reference numeral 10 and the radio resources indicated by the reference numeral 12. In other words, in GFDM, an interval corresponding to one symbol of OFDM is divided into an arbitrary number of subsymbols, and the number of subcarriers is smaller than that of OFDM accordingly. The structure of such radio resources makes it possible to change the symbol length in accordance with a parameter and to provide a more flexible transmission format.

Figure 2:
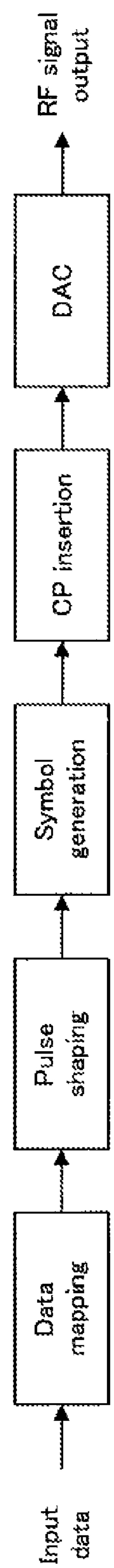
FIG. 2 is an explanatory diagram for describing a technique related to GFDM.
Figure 3:
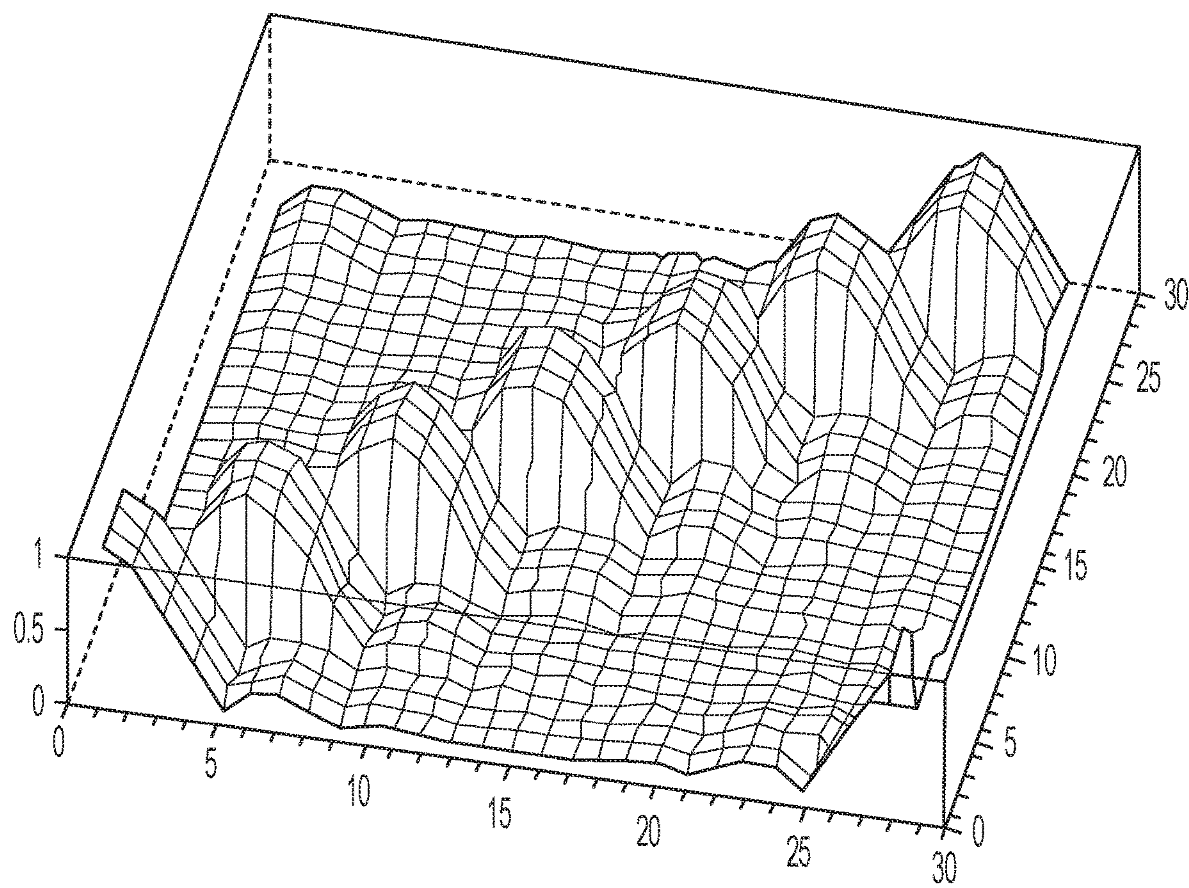
FIG. 3 is an explanatory diagram for describing a technique related to GFDM.
Figure 3:
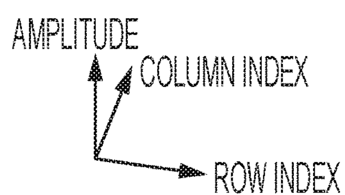

FIG. 2 is a diagram illustrating an example of a configuration example of a transmission apparatus supporting GFDM. First, if data is input, the transmission apparatus performs mapping of input data in order to apply filtering corresponding to the number of subcarriers and the number of subsymbols which are variably set. Further, here, the mapping for the subsymbol has an effect equivalent to that when over sampling is performed as compared with OFDM. Then, the transmission apparatus applies a pulse shaping filter to a predetermined number of subcarriers and a predetermined number of subsymbols (more specifically, multiplies by a predetermined filtering coefficient). Then, the transmission apparatus performs a frequency-time transform on a waveform after pulse shaping, and generates a symbol. Finally, the transmission apparatus adds a CP, applies a digital to analog converter (DAC), and outputs a radio frequency (RF) signal to a high frequency circuit.

Here, GFDM modulation is indicated by the following formula.

[Math. 1]

$$g_{k,m}[n] = g[(n - mK) \bmod N] \cdot \exp\left[j2\pi - \frac{k}{K}n\right] \quad (1)$$

[Math. 2]

$$x[n] = \sum_{m=0}^{M-1} \sum_{k=0}^{K-1} g_{k,m}[n] \cdot d_{k,m} \quad (2)$$

Here, K represents the number of subcarriers, M represents the number of subsymbols, $d_{k,m}$ is input data corresponding to an m-th subsymbol of a k-th subcarrier, x[n] is an n-th value of N (=KM) pieces of output data, and $g_{k,m}[n]$ is a coefficient of a filter.

The n-th output sample value x[n] of a GFDM symbol is obtained by summing all values obtained by multiplying the GFDM coefficients corresponding to the mapped input data. When n varies from 0 to N, the filter coefficient varies in accordance with the above-described formula (2), and a total of N sample values are obtained per symbol. As a result, a sample value of a time waveform obtained by performing over sampling on the subsymbol K times is generated. In this case, K times M subsymbols, that is, KM (=N), output values are obtained. The transmission apparatus performs D/A conversion on the GFDM symbol obtained accordingly, performs desired amplification and frequency conversion through a high frequency circuit, and then transmits resulting data from an antenna.

Further, for example, a raised cosine (RC) filter, a root raised cosine (RRC) filter, an isotropic orthogonal transfer algorithm (IOTA) filter, or the like can be employed as the pulse shaping filter.

A relation between input data (vector) and output data (vector) in the formulated GFDM modulation is indicated by a matrix A as in the following formula.

[Math. 3]

$$x = A \cdot d \quad (3)$$

The transformation matrix A is a square matrix including complex elements having a size of KM*KM. FIG. 3 is a diagram on which amplitude values (absolute values) of the elements (that is, filter coefficients) of the transformation matrix A are plotted. FIG. 3 illustrates a case in which K=4, M=7, and an RC filter (α=0.4) is employed as a prototype filter of waveform shaping.

Note that, in the present specification, the number of subsymbols refers to the number of subsymbols included in a unit resource (e.g., radio resource illustrated in FIG. 1). In addition, the number of subcarriers refers to the number of subcarriers included in a unit resource.

A frequency domain GFDM is a method of implementing GFDM modulation. The frequency domain GFDM is a modulation method in which input data is converted into the frequency domain, and a pulse shaping filter is then applied in the frequency domain. Afterward, mapping to a subcarrier is performed. In the present modulation method, a matrix involved in a GFDM modulation process is a matrix having a large number of elements that are zero. In addition, it is possible to use a fast calculation process such as a fast Fourier transform (FFT) or an inverse FFT (IFFT) for domain conversion. Therefore, a transmission apparatus can perform GFDM modulation with a small amount of calculation. There is also a similar advantage for a reception apparatus. Note that the detailed description of the frequency domain GFDM is disclosed, for example, in "N. Michailow et al., "Generalized Frequency Division Multiplexing: Analysis of an Alternative Multi-Carrier Technique for Next Generation Cellular Systems," IEEE International Symposium on Wireless Communication Systems (ISWCS), 2012." in detail.

In the frequency domain GFDM, the above-described formula (1) is transformed into the following formula (4), and the above-described formula (2) is transformed into the following formula (5).

[Math. 4]

$$x_k[n] = [(d_k[m]\delta[n - mK]) * g[n]] \cdot \exp\left[j2\pi \frac{k}{K}n\right] \quad (4)$$

[Math. 5]

$$x[n] = \sum_{k=0}^{K-1} x_k[n] \quad (5)$$

Note that "*" in the above-described formula (4) represents circular convolutions in a cycle KM. In addition, the above-described formula (4) represents the k-th subcarrier component. In addition, the above-described formula (5) indicates that K subcarrier components like this are mapped into a predetermined band.

The above-described formula (4) is transformed like the following formula by taking into consideration a conversion according to FFT from the time domain to the frequency domain, and a conversion according to IFFT from the frequency domain to the time domain.

[Math. 6]

$$x_k[n] = IFFT_{KM}\left\{FFT_{KM}(d_k[m]\delta[n-mK]) \cdot FFT_{KM}(g[n]) * FFT_{KM}\left(\exp\left[j2\pi\frac{k}{K}n\right]\right)\right\} \quad (6)$$

The above-described formula (6) indicates that a pulse shaping filter is applied in the frequency domain.

<1.2. Technical Problem>

In GFDM, in the case where the number of subsymbols and the number of subcarriers in a unit resource are both even numbers, the transformation matrix A is not regular, or has no inverse matrix. The problem is pointed out with difficulty in zero-forcing demodulation on the reception side. This problem is pointed out, for example, in Non-Patent Literature 1 above and "M. Matthe et al., "Generalized Frequency Division Multiplexing in a Gabor Transform Setting," IEEE COMMUNICATIONS LETTERS, vol. 18, no. 8, August 2014."

Moreover, in the case where the number of subsymbols in a unit resource is an even number, and the number of subcarriers is an odd number, the transformation matrix A has full rank and demodulation is possible on the reception side. However, there is a problem that the bit error rate of the demodulated data considerably degrades.

In this way, to allow the reception side to perform demodulation with an inverse matrix, and make it possible to prevent the bit error rate from considerably degrading, that is, to make a success of demodulation on the reception side, a restriction of setting an odd number of subsymbols in a unit resource is imposed. In the present embodiment, there is then provided a mechanism that makes a success of demodulation on the reception side even if the number of subsymbols is an odd number.

2. SCHEMATIC CONFIGURATION OF SYSTEM

Figure 4:
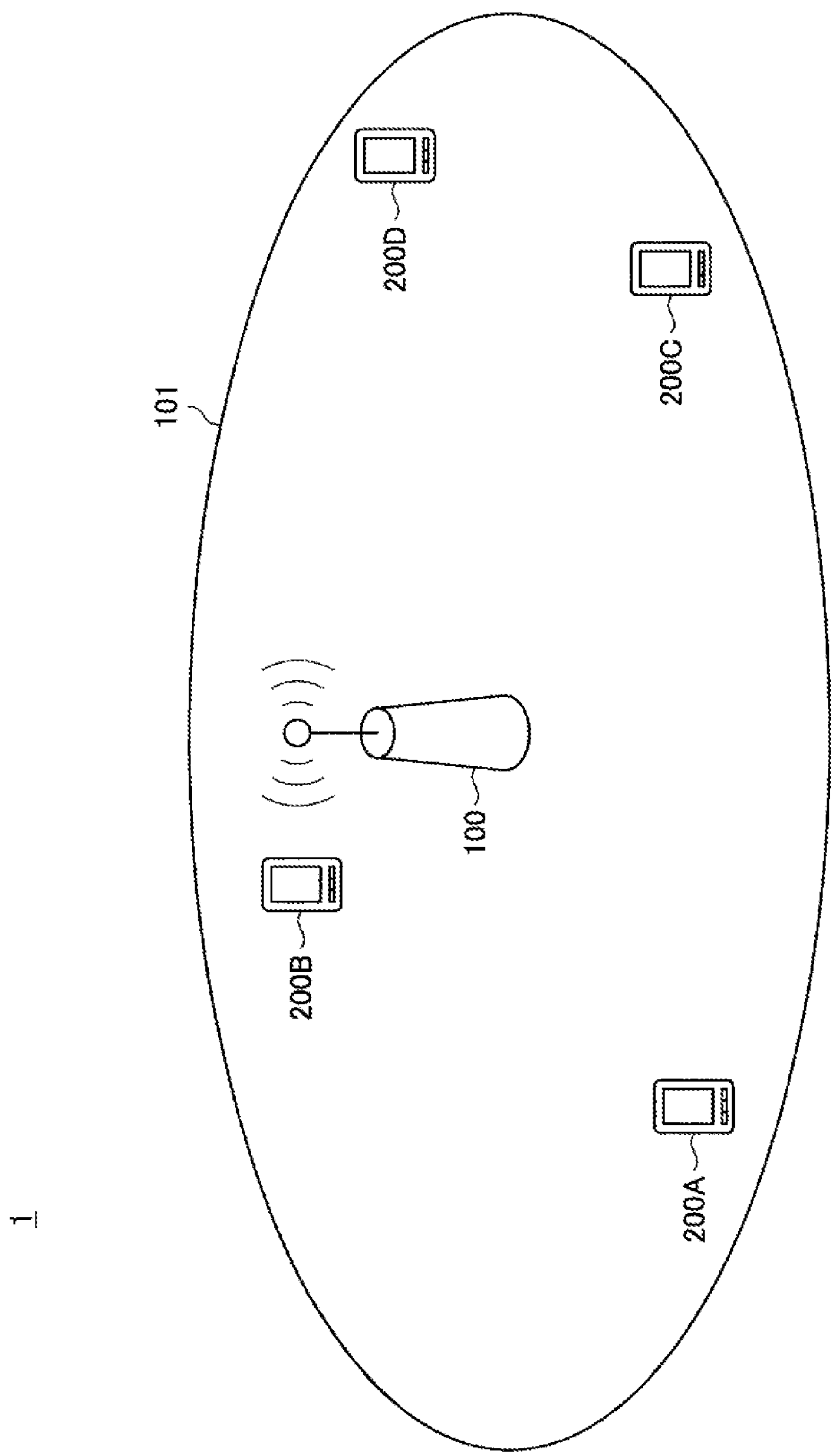
FIG. 4 is an explanatory diagram illustrating an example of a schematic configuration of a system according to the present embodiment.

Next, a schematic configuration of a system 1 according to an embodiment of the present disclosure will be described with reference to FIG. 4. FIG. 4 is an explanatory diagram illustrating an example of a schematic configuration of the system 1 according to an embodiment of the present disclosure. Referring to FIG. 4, the system 1 includes a base station 100 and a terminal apparatus 200. Here, the terminal apparatus 200 is also referred to as a "user." The user may also be referred to as "user equipment (UE)." Here, the UE may be UE defined in LTE or LTE-A or may mean a communication apparatus more generally.

(1) Base Station 100

The base station 100 is a base station of a cellular system (or a mobile communication system). The base station 100 performs wireless communication with a terminal apparatus (for example, the terminal apparatus 200) located within a cell 101 of the base station 100. For example, the base station 100 transmits a downlink signal to the terminal apparatus and receives an uplink signal from the terminal apparatus.

(2) Terminal Apparatus 200

The terminal apparatus 200 can perform communication in the cellular system (or the mobile communication system). The terminal apparatus 200 performs wireless communication with the base station of the cellular system (for example, the base station 100). For example, the terminal apparatus 200 receives a downlink signal from the base station and transmits an uplink signal to the base station.

(3) Multiplexing/Multiple Access

Particularly, in an embodiment of the present disclosure, the base station 100 performs wireless communication with a plurality of terminal apparatuses via orthogonal multiple access/non-orthogonal multiple access. More specifically, the base station 100 performs wireless communication with a plurality of terminal apparatuses 200 through multiplexing/multiple access using GFDM.

For example, the base station 100 performs wireless communication with a plurality of terminal apparatuses 200 by multiplexing/multiple access using GFDM in the downlink. More specifically, for example, the base station 100 multiplexes signals destined for a plurality of terminal apparatuses 200 using GFDM. In this case, for example, the terminal apparatus 200 removes one or more other signals serving as interference from a multiplexed signal including a desired signal (that is, a signal destined for the terminal apparatus 200), and decodes the desired signal.

The base station 100 may perform wireless communication with a plurality of terminal apparatuses by multiplexing/multiple access using GFDM in the uplink instead of the downlink or together with the downlink. In this case, the base station 100 may decode each of signals from the multiplexed signal including the signals transmitted from a plurality of terminal apparatuses.

(4) Supplemental Information

The present technology can also be applied to multi-cell systems such as heterogeneous networks (HetNet) or small cell enhancement (SCE). Further, the present technology can also be applied to MTC apparatuses and IoT apparatuses.

3. CONFIGURATION OF EACH APPARATUS

Figure 5:
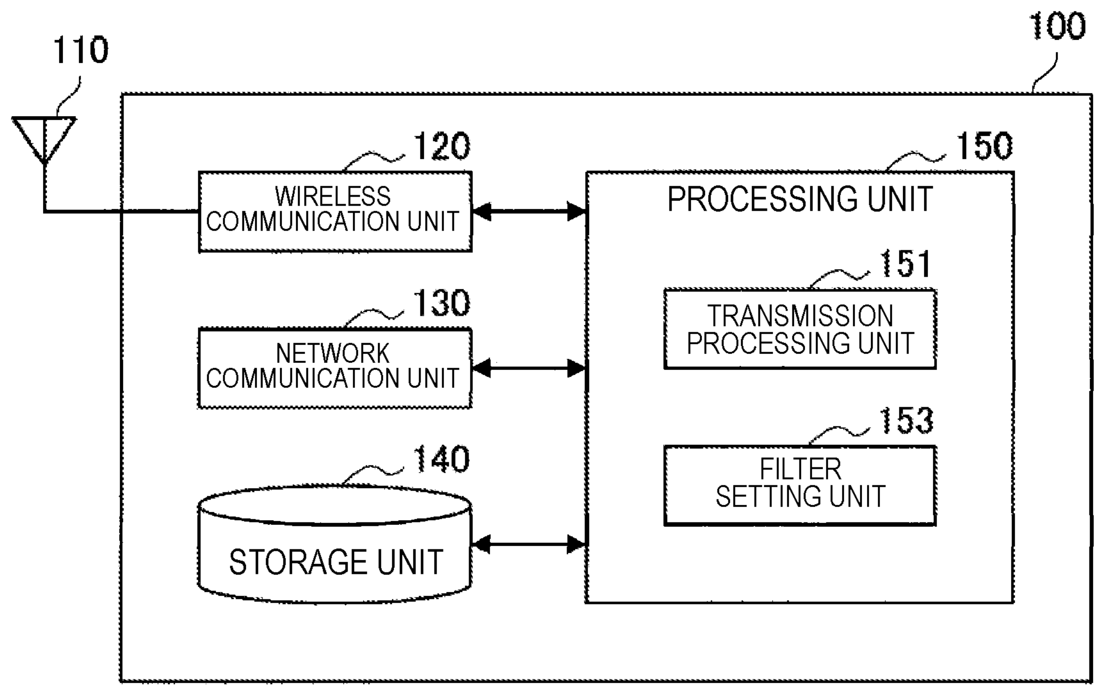
FIG. 5 is a block diagram illustrating an example of a configuration of a base station according to the present embodiment.
Figure 6:
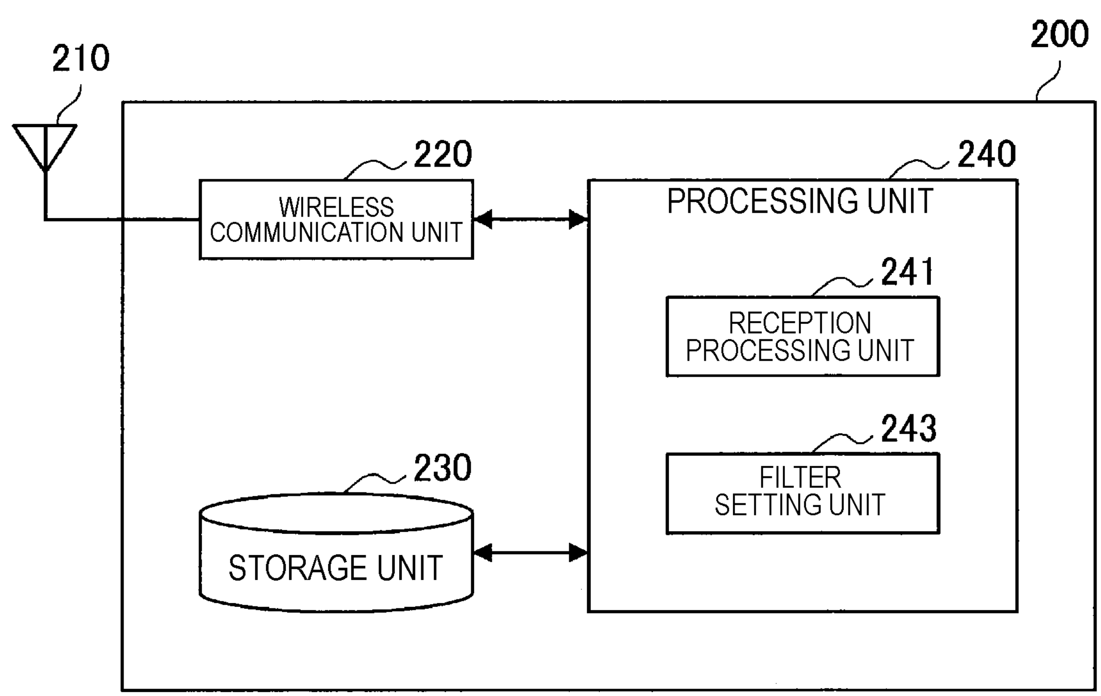
FIG. 6 is a block diagram illustrating an example of a configuration of a terminal apparatus according to the present embodiment.

Next, configurations of the base station 100 and the terminal apparatus 200 according to the present disclosure will be described with reference to FIGS. 5 and 6.

<3.1. Configuration of Base Station>

First, an example of a configuration of the base station 100 according to an embodiment of the present disclosure will be described with reference to FIG. 5. FIG. 5 is a block diagram illustrating an example of a configuration of the base station 100 according to an embodiment of the present disclosure. Referring to FIG. 5, the base station 100 includes an antenna unit 110, a wireless communication unit 120, a network communication unit 130, a storage unit 140, and a processing unit 150.

(1) Antenna Unit 110

The antenna unit 110 radiates signals outputted from the wireless communication unit 120 into space as radio waves. Further, the antenna unit 110 converts radio waves in space into signals, and outputs the signals to the wireless communication unit 120.

(2) Wireless Communication Unit 120

The wireless communication unit 120 transmits and receives signals. For example, the wireless communication unit 120 transmits a downlink signal to the terminal apparatus, and receives an uplink signal from the terminal apparatus.

(3) Network Communication Unit 130

The network communication unit 130 transmits and receives information. For example, the network communication unit 130 transmits information to other nodes and receives information from the other nodes. Examples of other nodes include other base stations and core network nodes.

(4) Storage Unit 140

The storage unit 140 temporarily or permanently stores programs and various types of data for an operation of the base station 100.

(5) Processing Unit 150

The processing unit 150 provides various functions of the base station 100. The processing unit 150 includes a transmission processing unit 151 and a filter setting unit 153. Note that the processing unit 150 may further include components other than these components. In other words, the processing unit 150 may also perform operations other than the operations of these components.

The functions of the transmission processing unit 151 and the filter setting unit 153 will be described below in detail.

<3.2. Configuration of Terminal Apparatus>

First, an example of the configuration of the terminal apparatus 200 according to an embodiment of the present disclosure will be described with reference to FIG. 6. FIG. 6 is a block diagram illustrating an example of a configuration of a terminal apparatus 200 according to an embodiment of the present disclosure. Referring to FIG. 6, the terminal apparatus 200 includes an antenna unit 210, a wireless communication unit 220, a storage unit 230, and a processing unit 240.

(1) Antenna Unit 210

The antenna unit 210 radiates signals outputted from the wireless communication unit 220 into space as radio waves. Further, the antenna unit 210 converts radio waves in space into signals, and outputs the signals to the wireless communication unit 220.

(2) Wireless Communication Unit 220

The wireless communication unit 220 transmits and receives signals. For example, the wireless communication unit 220 receives a downlink signal from the base station and transmits an uplink signal to the base station.

(3) Storage Unit 230

The storage unit 230 temporarily or permanently stores programs and various types of data for an operation of the terminal apparatus 200.

(4) Processing Unit 240

The processing unit 240 provides various functions of the terminal apparatus 200. The processing unit 240 includes a reception processing unit 241 and a filter setting unit 243. Note that the processing unit 240 may further include components other than these components. In other words, the processing unit 240 may also perform operations other than the operations of these components.

The functions of the reception processing unit 241 and the filter setting unit 243 will be described below in detail.

4. TECHNICAL FEATURES

Technical features of the present embodiment will be described below under the assumption that the base station 100 is a transmission apparatus, and the terminal apparatus 200 is a reception apparatus.

<4.1. Transmission Process>

First, with reference to FIGS. 7 to 15, a technical feature related to a transmission process will be described.

(1) Configuration Example of Transmission Apparatus

The base station 100 (e.g., transmission processing unit 151) performs GFDM modulation. In other words, the base station 100 variably sets at least one of the number of subcarriers or the number of subsymbols included in a unit resource including one or more subcarriers or one or more subsymbols. The base station 100 then performs filtering for each subcarrier with a pulse shaping filter (i.e., multiplies a filter coefficient).

Above all, the base station 100 according to the present embodiment performs GFDM modulation in the framework of the frequency domain GFDM. That is, the base station 100 applies up sampling in the frequency domain, and uses a filter coefficient to perform filtering after this up sampling. This makes it possible to perform GFDM modulation with a small amount of calculation.

Figure 7:
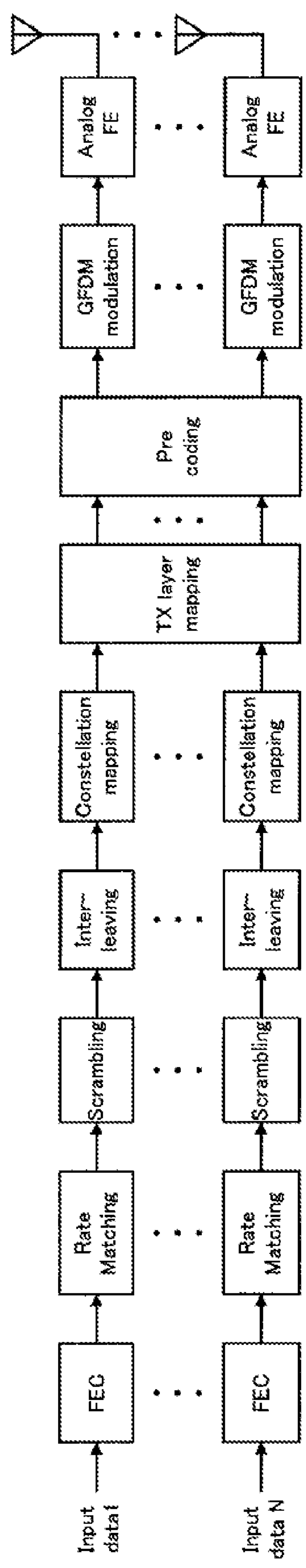
FIG. 7 is an explanatory diagram for describing a technical feature related to a transmission process according to the present embodiment.
Figure 8:
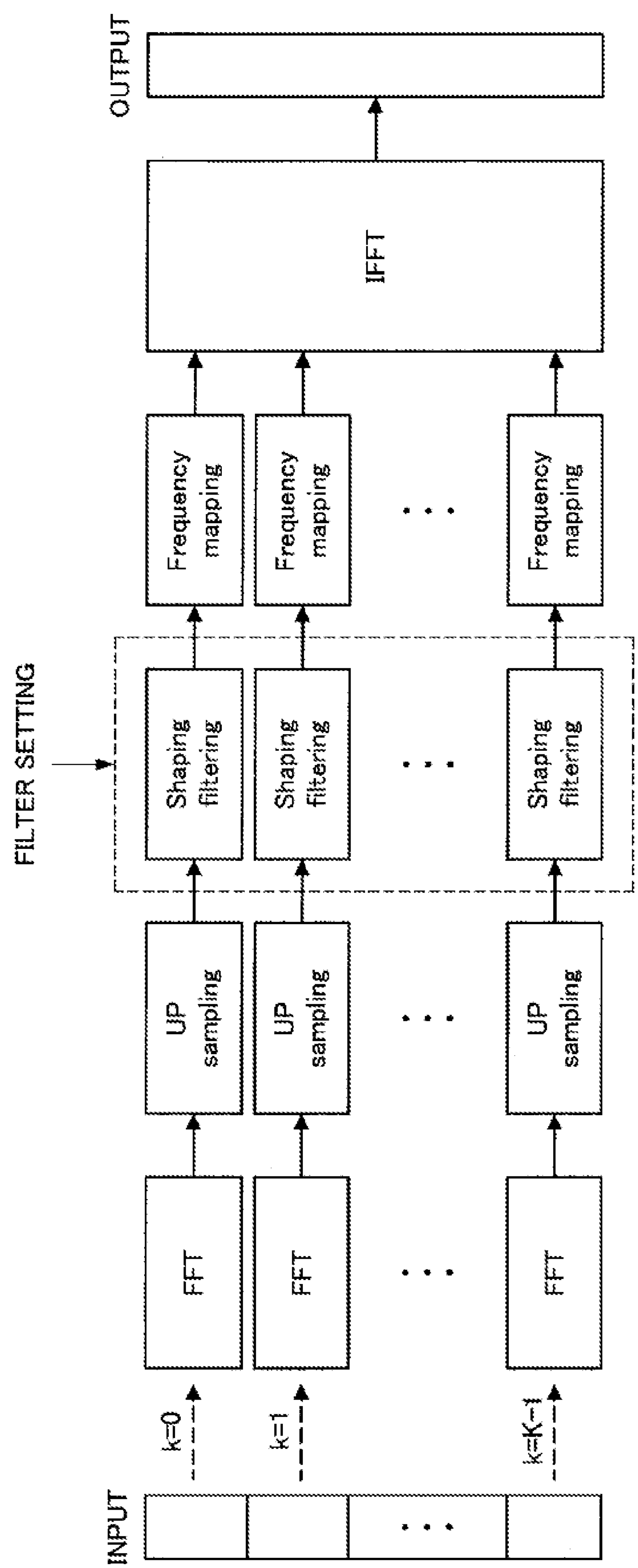
FIG. 8 is an explanatory diagram for describing a technical feature related to the transmission process according to the present embodiment.

With reference to FIGS. 7 and 8, the following describes a transmission process that is performed in the framework of the frequency domain GFDM, and entails GFDM modulation.

FIG. 7 is a block diagram illustrating an example of the configuration of a transmission apparatus (i.e., base station 100) according to the present embodiment. FIG. 7 illustrates a configuration example in the case of MIMO (multiple-input and multiple-output). As illustrated in FIG. 7, the transmission apparatus performs forward error correction (FEC) coding, rate matching, scrambling, interleaving, and mapping (constellation mapping) from a bit string to a symbol (which may be, for example, a complex symbol or may also be referred to as a signal point) for each multiplexed transmission data. Then, the transmission apparatus performs multiplexing through transmission layer mapping and performs precoding for each multiplexed signal. A subsequent process is performed for each multiplexed signal. The transmission apparatus performs GFDM modulation for each multiplexed signal, performs signal processing with an analog front end (FE), and transmits a wireless signal from an antenna.

Note that the analog FE may correspond to the wireless communication unit 120, the antenna may correspond to the antenna unit 110, and the other components may correspond to the processing unit 150. Of course, any other correspondence relation is allowed.

Next, with reference to FIG. 8, the GFDM modulator illustrated in FIG. 7 will be described in detail.

FIG. 8 is a block diagram illustrating an example of the configuration of a GFDM modulator in the frequency domain GFDM. As illustrated in 8, the GFDM modulator divides an input signal into K subcarriers, and sets each of them as M complex signals. The GFDM modulator then applies FFT to each of them for conversion into the frequency domain. Next, a GFDM converter applies up sampling to each signal in the frequency domain, and applies a pulse shaping filter. The settings of the filter coefficient of the pulse shaping filter will be described below in detail. In the typical frequency domain GFDM, the up sampling ratio is 2. An RC filter or an RRC filter is used for the pulse shaping filter. Needless to say, the up sampling ratio may have a value other than 2. Any filter may be used for the pulse shaping filter. Next, the GFDM converter maps the signal after the filtering to the frequency of the corresponding subcarrier. Finally, the GFDM converter multiplexes the frequency of the K signals generated in this way, and uses IFFT for conversion into signals in the time domain, thereby generating and outputting signals that have been subjected to GFDM modulation.

The above-described GFDM modulation in the frequency domain GFDM can be expressed with the following equivalent matrix expression.

[Math. 7]

$$x = W_{KM}^{H} \sum_{k=0}^{K-1} P^{(k)} \Gamma^{(L)} R^{(L)} W_M d_k \tag{7}$$

Note that L represents the up sample ratio (i.e., over sample ratio) of up sampling. In addition, $W^{H}_{KM}$ represents IFFT of KM*KM. In addition, $p^{(k)}$ represents the frequency mapping matrix of KM*LM which corresponds to the k-th subcarrier. In addition, $\Gamma^{(L)}$ represents the filter coefficient matrix of the pulse shaping filter of LM*LM. In addition, $R^{(L)}$ represents the up sampling matrix of LM*M. In addition, $W_M$ represents FFT of M*M.

A transformation matrix $A_F$ in the frequency domain GFDM is expressed with the following formula.

[Math. 8]

$$A_F = W_{KM}^{H} \sum_{k=0}^{K-1} P^{(k)} \Gamma^{(L)} R^{(L)} W_M \tag{8}$$

It is, however, known that $W^{H}_{KM}$ and $W_M$ are always regular. Thus, whether the transformation matrix $A_F$ shown in the above-described formula (8) is regular or irregular depends on whether the matrix shown in the following formula is regular or irregular.

[Math. 9]

$$A'_F = \sum_{k=0}^{K-1} P^{(k)} \Gamma^{(L)} R^{(L)} \tag{9}$$

In the frequency domain GFDM, in the case where the number of subsymbols and the number of subcarriers in a unit resource are even numbers, a matrix $A'_F$ that decides whether the transformation matrix $A_F$ is regular/irregular is irregular, and there is no inverse matrix. Accordingly, demodulation is difficult on the reception side.

(2) Settings of Filter Coefficient

In view of such circumstances, the base station 100 (e.g., filter setting unit 153) according to the present embodiment sets a filter coefficient applied to a transmission signal (more specifically, signal in the frequency domain which is mapped to each subcarrier) in accordance with different rules that depend on whether the number of subsymbols included in a unit resource is an even number or an odd number. The following also refers to a rule in the case of an odd number as first rule, and refers to a rule in the case of an even number as second rule.

The base station 100 sets, as a filter coefficient, a value obtained by sampling a prototypical filter at predetermined intervals (i.e., sampling frequency) from a predetermined position (i.e., sampling start position) on the frequency axis. The base station 100 then samples the prototypical filter at equal intervals by the product of the over sample ratio of the up sampling and the number of subsymbols. Here, this sampling start position is different in accordance with whether the number of subsymbols included in a unit resource is an even number or an odd number. That is, the first rule and the second rule have different sampling start positions.

The sampling start position in the case where the number of subsymbols is an odd number is a default position. This is because, even if the sampling start position remains the default position, the transformation matrix $A_F$ is regular and there is an inverse matrix in the case where the number of subsymbols is an odd number. Note that the default position is the cycle start position (i.e., $-\pi$) of sampling angular frequency.

Meanwhile, the sampling start position in the case where the number of subsymbols is an even number is the position obtained by adding an offset to the default position. Providing an offset causes the presence of the inverse matrix of the transformation matrix $A_F$, and makes zero-forcing demodulation possible on the reception side.

For example, the offset may correspond to ½ of the sample frequency of sampling from the prototypical filter. This maximizes a different between filter coefficients each of which is applied to the overlapping or close frequency of a signal corresponding to each of two adjacent subcarriers, and it is thus possible to minimize the interference between the subcarriers. This prevents the bit error rate from considerably degrading, and improves the demodulation performance of the reception side. This point will be described below in detail with reference to FIG. 13.

With reference to FIGS. 9 to 13, the following uses a specific example to describe the settings of a filter coefficient. FIGS. 9 to 13 each illustrate frequency characteristics of a prototypical filter. The horizontal axis represents frequency. The vertical axis represents an amplitude value. The amplitude value at the position of sampling is adopted as a filter coefficient.

Figure 9:
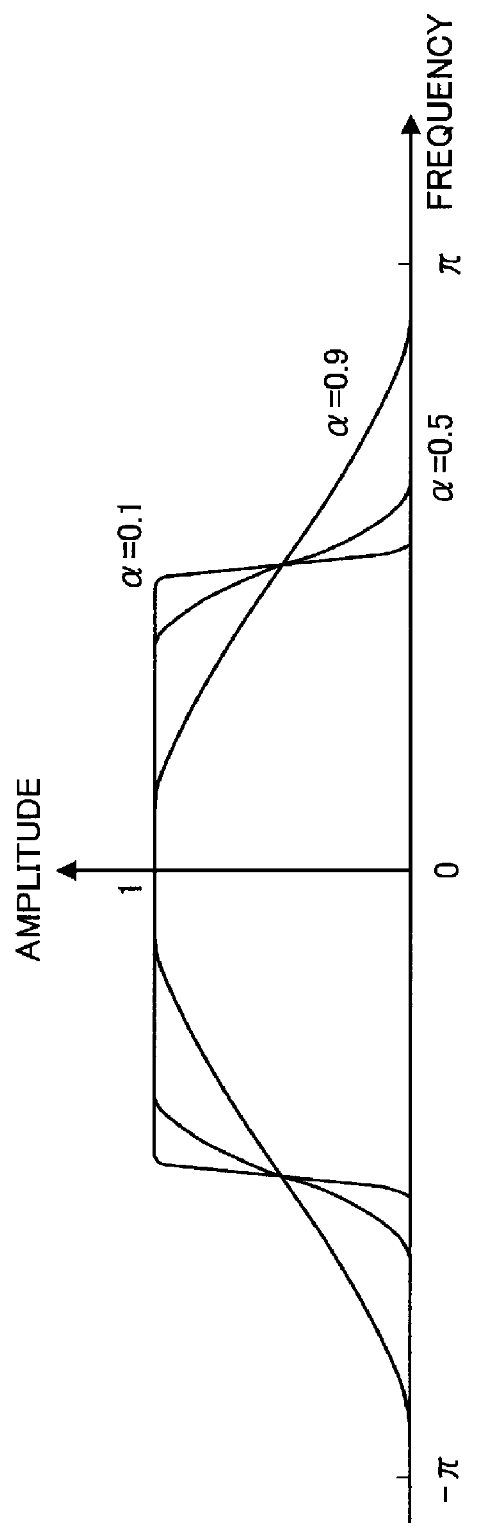
FIG. 9 is an explanatory diagram for describing a technical feature related to the transmission process according to the present embodiment.

FIG. 9 is a diagram illustrating an example of a frequency characteristic of a prototypical filter of a pulse shaping filter. Here, as an example, an example will be described in which an RC filter is used as the pulse shaping filter. As illustrated in FIG. 9, in the RC filter, the value of a roll-off factor $\alpha$ varies a frequency characteristic. The following assumes $\alpha$=0.9 as an example. Needless to say, the value of a may be a value other than 0.9.

Figure 10:
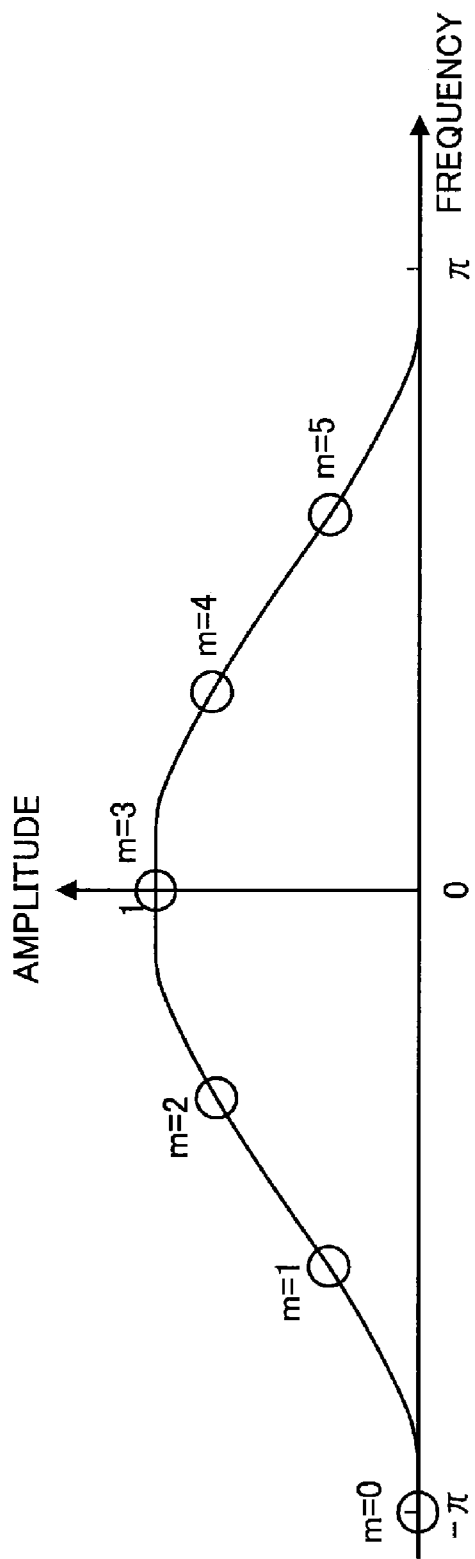
FIG. 10 is an explanatory diagram for describing a technical feature related to the transmission process according to the present embodiment.

First, the case where the number M of subsymbols is an odd number, and the first rule is applied will be described. In the case where the number M of subsymbols=3, and the over sample ratio L=2, as illustrated in FIG. 10, sampling in the frequency domain offers six filter coefficient values [0, 0.225, 0.775, 1, 0.775, 0.225]. The value of m in the figure represents a sampling index. As illustrated in FIG. 10, sampling is begun at a default position $-\pi$. If the number K of subcarriers=2, the matrix $A'_F$ is expressed with the following formula.

[Math. 10]

$$A'_F = \begin{pmatrix} 1 & 0 & 0 & 0 & 0 & 0 \\ 0 & 0.775 & 0 & 0 & 0.225 & 0 \\ 0 & 0 & 0.225 & 0 & 0 & 0.775 \\ 0 & 0 & 0 & 1 & 0 & 0 \\ 0 & 0.225 & 0 & 0 & 0.775 & 0 \\ 0 & 0 & 0.775 & 0 & 0 & 0.225 \end{pmatrix} \tag{10}$$

This matrix $A'_F$ has full rank, and is therefore regular. In this way, in the case where the number M of subsymbols is an odd number, demodulation on the reception side results in success.

Figure 11:
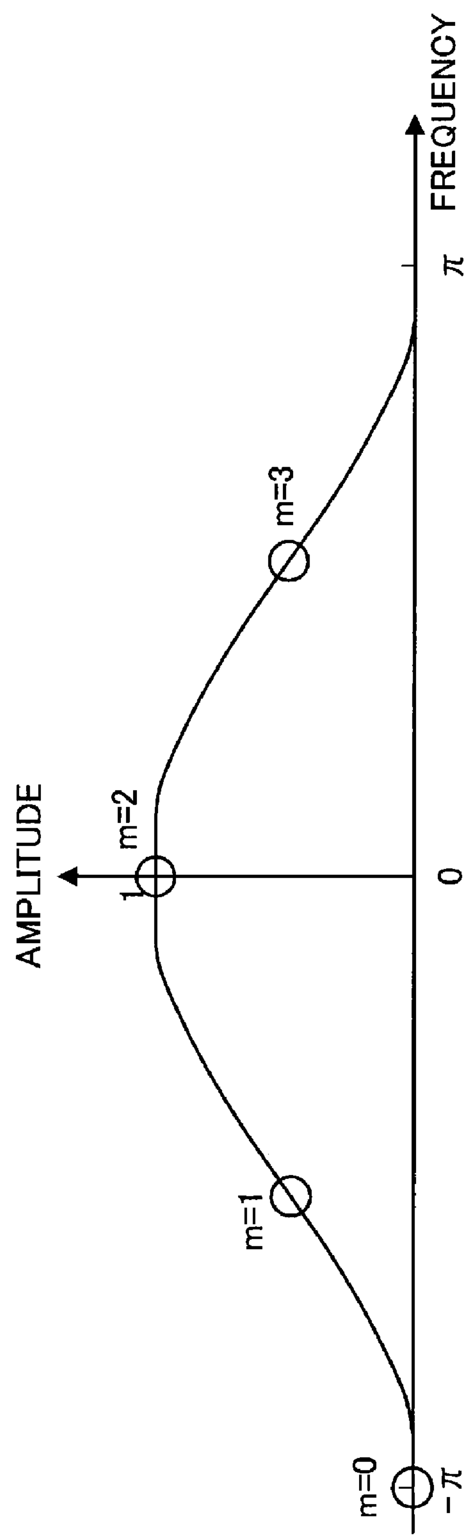
FIG. 11 is an explanatory diagram for describing a technical feature related to the transmission process according to the present embodiment.

Next, as a comparative example, the case where the number M of subsymbols is an even number, and the first rule is applied will be described. In the case where the number M of subsymbols=2, and the over sample ratio L=2, as illustrated in FIG. 11, sampling in the frequency domain offers four filter coefficient values [0, 0.5, 1, 0.5]. As illustrated in FIG. 11, sampling is begun at a default position $-\pi$. If the number K of subcarriers=2, the matrix $A'_F$ is expressed with the following formula.

[Math. 11]

$$A'_F = \begin{pmatrix} 1 & 0 & 0 & 0 \\ 0 & 0.5 & 0 & 0.5 \\ 0 & 0 & 1 & 0 \\ 0 & 0.5 & 0 & 0.5 \end{pmatrix} \tag{11}$$

This matrix $A'_F$ has rank 3, but does not have full rank. There is thus no inverse matrix, so that the reception side fails in demodulation.

Figure 12:
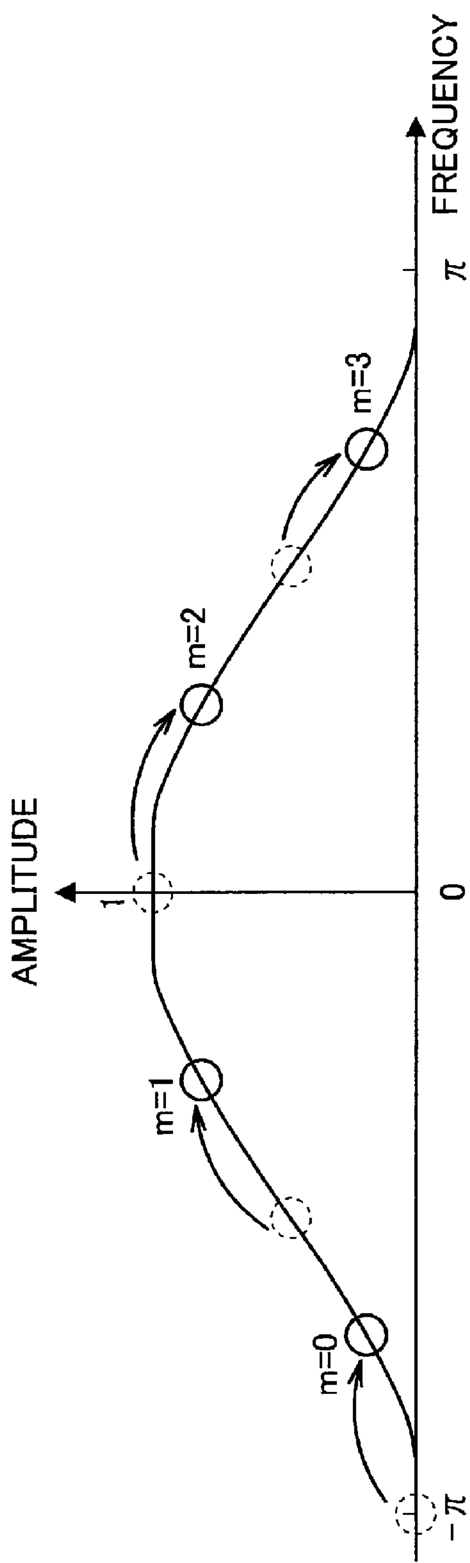
FIG. 12 is an explanatory diagram for describing a technical feature related to the transmission process according to the present embodiment.

Next, the case where the number M of subsymbols is an even number, and the second rule is applied will be described. Specifically, the base station 100 adopts, as a filter coefficient, a value obtained by performing sampling with a shift of an offset (i.e., ½ sample frequency). For example, with regard to the example illustrated in FIG. 11, as illustrated in FIG. 12, four filter coefficient values [0.117, 0.883, 0.883, 0.117] are obtained. As illustrated in FIG. 12, sampling is begun at the position obtained by adding the offset corresponding to the ½ sample frequency to the default position $-\pi$. If the number K of subcarriers=2, the matrix $A'_F$ is expressed with the following formula.

[Math. 12]

$$A'_F = \begin{pmatrix} 0.883 & 0 & 0.117 & 0 \\ 0 & 0.117 & 0 & 0.883 \\ 0{,}117 & 0 & 0.883 & 0 \\ 0 & 0.883 & 0 & 0.117 \end{pmatrix} \tag{12}$$

This matrix $A'_F$ has rank 4, and has full rank. There is thus an inverse matrix, so that demodulation on the reception side results in success. Further, with reference to FIG. 13, the advantage of an offset being the ½ sample frequency will be described.

Figure 13:
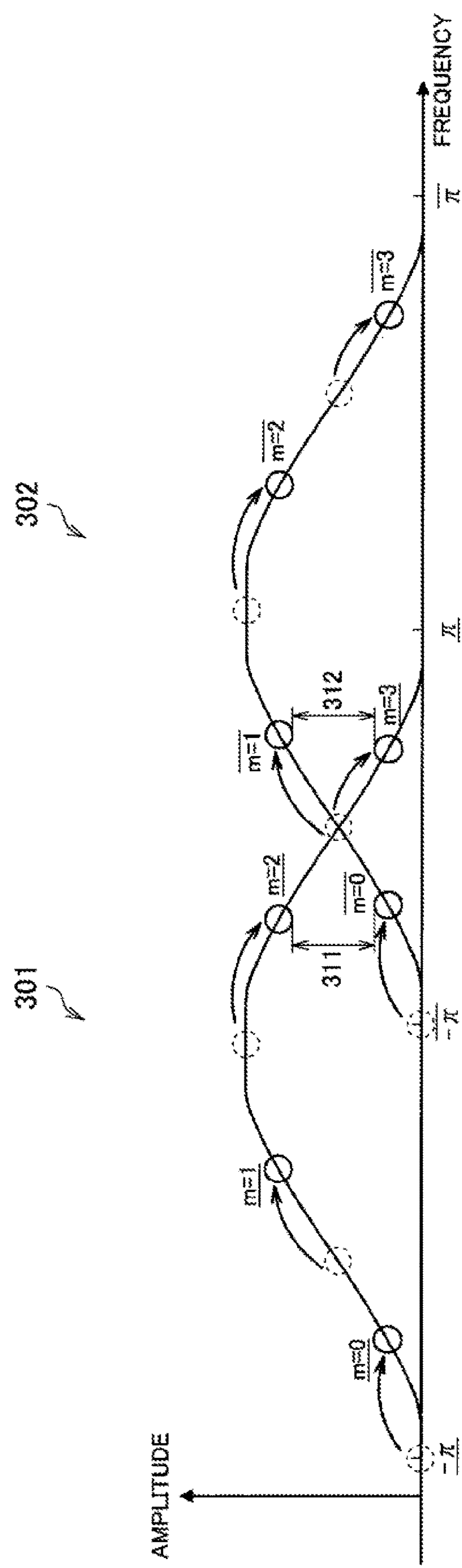
FIG. 13 is an explanatory diagram for describing a technical feature related to the transmission process according to the present embodiment.

FIG. 13 is a diagram illustrating the relationship between filter coefficients applied to the respective signals corresponding to two adjacent subcarriers in the case where an offset is ½ of sample frequency. A reference numeral 301 represents a frequency characteristic of a prototypical filter and a filter coefficient of a pulse shaping filter applied to the signal corresponding to a first subcarrier. Frequency and frequency $-\pi$ and the value of a sampling index m regarding the reference numeral 301 are underlined. A reference numeral 302 represents a frequency characteristic of a prototypical filter and a filter coefficient of a pulse shaping filter applied to the signal corresponding to a second subcarrier adjacent to the first subcarrier. Frequency $\pi$ and frequency $-\pi$ and the value of a sampling index m regarding the reference numeral 302 are overlined. As illustrated in FIG. 13, the frequency of the prototypical filter represented by the reference numeral 301 and the frequency of the prototypical filter represented by the reference numeral 302 partially overlap with each other. However, filter coefficients applied in the overlapping or close frequency of the signal corresponding to the first or second subcarrier are different. The value of the smaller one of differences 311 and 312 between the respective filter coefficients applied in the overlapping or close frequency of the signal corresponding to the first or second subcarrier is then the largest in the case where the offset is ½ sample frequency. Therefore, in the case where the offset is ½ sample frequency, the interference between the subcarriers is the least. Accordingly, the bit error rate is prevented from considerably degrading, and the demodulation performance of the reception side is improved.

As described above, even if the number of subsymbols is an even number, the base station 100 can make a success of demodulation on the reception side by providing an offset to the sampling start position in the second rule.

The following describes sampling with a filter coefficient in more detail.

The bandwidth (i.e., $2\pi$) of a pulse shaping filter is applied to a band enlarged to L times an original subcarrier bandwidth $f_{sub}$. That is, the following formula holds.

[Math. 13]

$$L \cdot f_{sub} = 2\pi \tag{13}$$

Meanwhile, sample frequency (i.e., sampling interval) $f_s$ corresponds to the width obtained by dividing the filter bandwidth by LM as shown in the following formula.

[Math. 14]

$$f_s = \frac{2\pi}{LM} \tag{14}$$

Therefore, the ½ sample frequency of the offset is expressed with the following formula.

[Math. 15]

$$f_s/2 = \frac{\pi}{LM} \tag{15}$$

For example, in the case where L=2 and M=2, the ½ sample frequency is $\pi/4$.

If the formula (13) is substituted for the formula (15), this ½ sample frequency is expressed with the subcarrier frequency (i.e., bandwidth of the subcarrier) in the following formula.

[Math. 16]

$$f_s/2 = \frac{f_{sub}}{2M} \tag{16}$$

In this way, the offset (i.e., ½ sample frequency) in the case where the number of subsymbols is an even number corresponds to the value obtained by dividing the subcarrier frequency by a multiple of the number M of subsymbols. The offset is remarkably a value that does not depend on the over sample ratio L, but depends on only the subcarrier frequency and the number M of subsymbols.

It will be summarized what has been described above. In the case where the number of subsymbols is an odd number, the LM values of $-\pi+i*2\pi/LM$, where i=0, . . . , LM−1, which are sampled from the prototypical filter are filter coefficients. In addition, in the case where the number of subsymbols is an even number, the LM values of $-\pi+i*2\pi/LM+\pi/LM$, where i=0, . . . , LM−1, which are sampled from the prototypical filter are filter coefficients.

(3) Processing Flow

Figure 14:
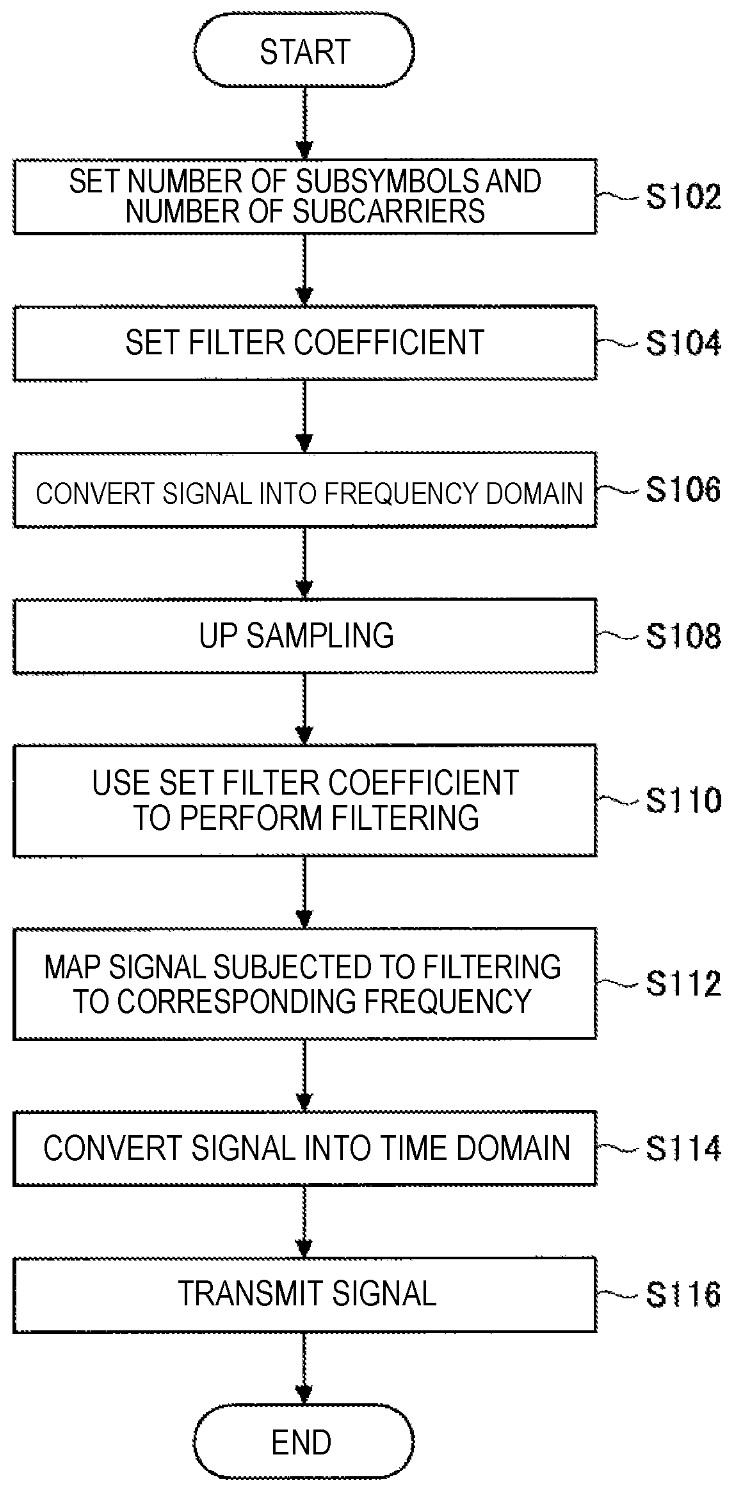
FIG. 14 is an explanatory diagram for describing a technical feature related to the transmission process according to the present embodiment.
Figure 15:
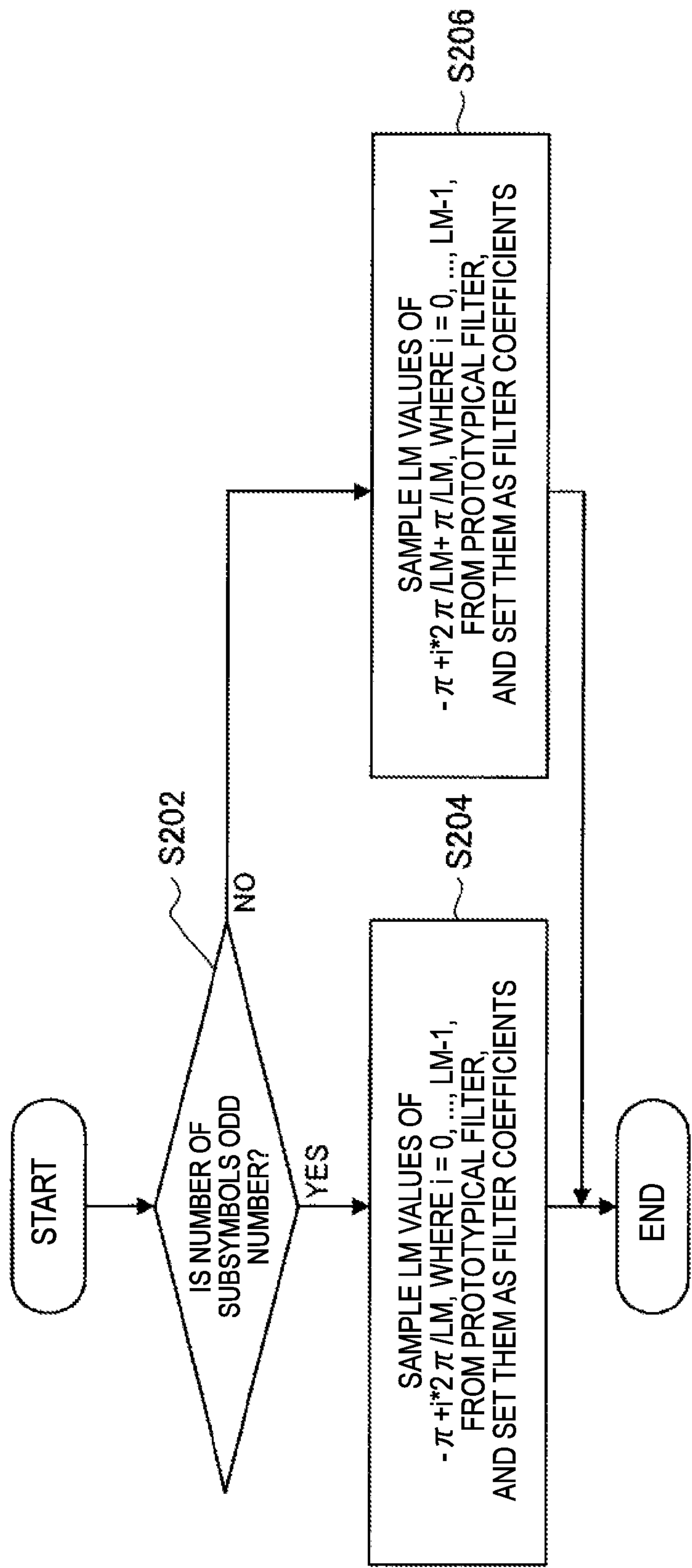
FIG. 15 is an explanatory diagram for describing a technical feature related to the transmission process according to the present embodiment.

With reference to FIGS. 14 and 15, the following describes the processing flow in the transmission apparatus.

FIG. 14 is a flowchart illustrating an example of the flow of the transmission process executed in the base station 100 according to the present embodiment. As illustrated in FIG. 14, the transmission processing unit 151 first sets the number of subsymbols and the number of subcarriers (step S102). Next, the filter setting unit 153 sets a filter coefficient on the basis of the set number of subsymbols (step S104). Specifically, in the case where the number of subsymbols is an odd number, the filter setting unit 153 sets the filter coefficient sampled from the prototypical filter in accordance with the first rule. In the case where the number of subsymbols is an even number, the filter setting unit 153 sets the filter coefficient sampled from the prototypical filter in accordance with the second rule. Next, the transmission processing unit 151 applies FFT to a signal that has been subjected to the respective processes from FEC encoding to pre coding illustrated in FIG. 7, and converts the signal into a signal in the frequency domain (step S106). At that time, the transmission processing unit 151 divides, as described above with reference to FIG. 8, an input signal into K subcarriers, and sets each of them as M complex signals. The transmission processing unit 151 then applies FFT to each of them for conversion into the frequency domain. Next, the transmission processing unit 151 applies up sampling to each signal in the frequency domain (step S108), and uses the filter coefficient set in step S104 to perform filtering (step S110). Next, the transmission processing unit 151 maps each signal after the filtering to the frequency of the corresponding subcarrier, and multiplexes the frequency (step S112). The transmission processing unit 151 then converts the signal whose frequency is multiplexed into a signal in the time domain according to IFFT (step S114), and transmits the signal (step S116). After the above steps, the process ends.

Next, the flow of the process in step S104 will be described with reference to FIG. 15.

FIG. 15 is a flowchart illustrating an example of the flow of the filter coefficient setting process performed in the base station 100 according to the present embodiment. As illustrated in FIG. 15, the filter setting unit 153 first determines whether or not the number of subsymbols is an odd number (step S202). In the case where it is determined that the number of subsymbols is an odd number (step S202/YES), the filter setting unit 153 samples the LM values of $-\pi+i*2\pi/LM$, where i=0, . . . , LM−1, from the prototypical filter, and sets them as filter coefficients (step S204). Meanwhile, in the case where it is determined that the number of subsymbols is an even number (step S202/NO), the filter setting unit 153 samples the LM values of $-\pi+i*2\pi/LM+\pi/LM$, where i=0, . . . , LM−1, from the prototypical filter, and sets them as filter coefficients (step S206). After the above steps, the process ends.

<4.2. Reception Process>

Next, with reference to FIGS. 16 to 18, a technical feature related to a reception process will be described.

(1) Configuration Example of Reception Apparatus

The terminal apparatus 200 (e.g., reception processing unit 241) receives a signal that is subjected to GFDM modulation and transmitted, and performs GFDM demodulation. That is, the terminal apparatus 200 receives and demodulates a signal that is transmitted by variably setting at least any of the number of subcarriers or the number of subsymbols included in a unit resource including one or more subcarriers or one or more subsymbols, and acquires data. At that time, the terminal apparatus 200 applies the pulse shaping filter corresponding to the pulse shaping filter applied on the transmission side (i.e., multiplies a filter coefficient), and performs the down sampling corresponding to the up sampling applied on the transmission side.

Above all, the terminal apparatus 200 according to the present embodiment performs GFDM demodulation in the framework of the frequency domain GFDM. That is, the terminal apparatus 200 uses a filter coefficient in the frequency domain to perform filtering, and then applies down sampling. This makes it possible to perform GFDM demodulation with a small amount of calculation.

Figure 16:
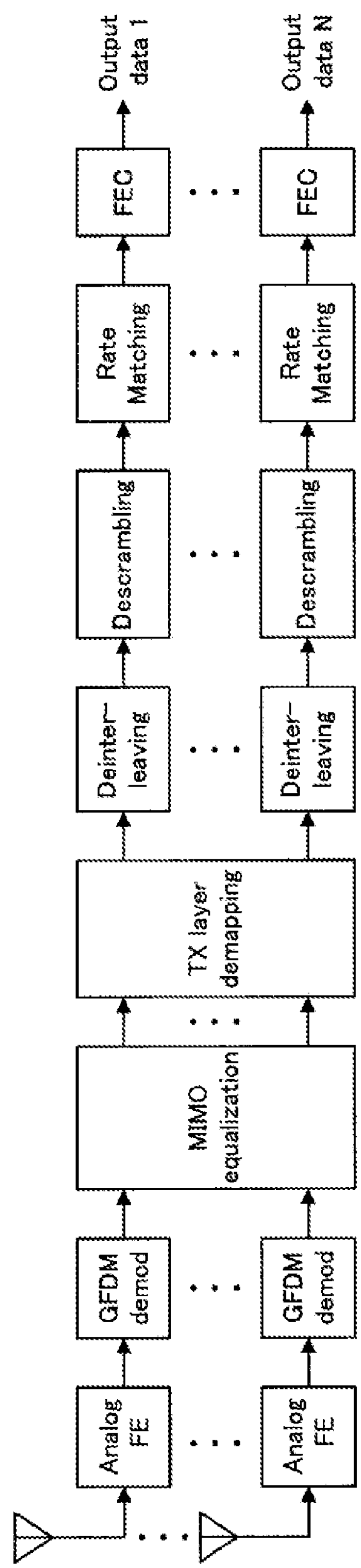
FIG. 16 is an explanatory diagram for describing a technical feature related to a reception process according to the present embodiment.
Figure 17:
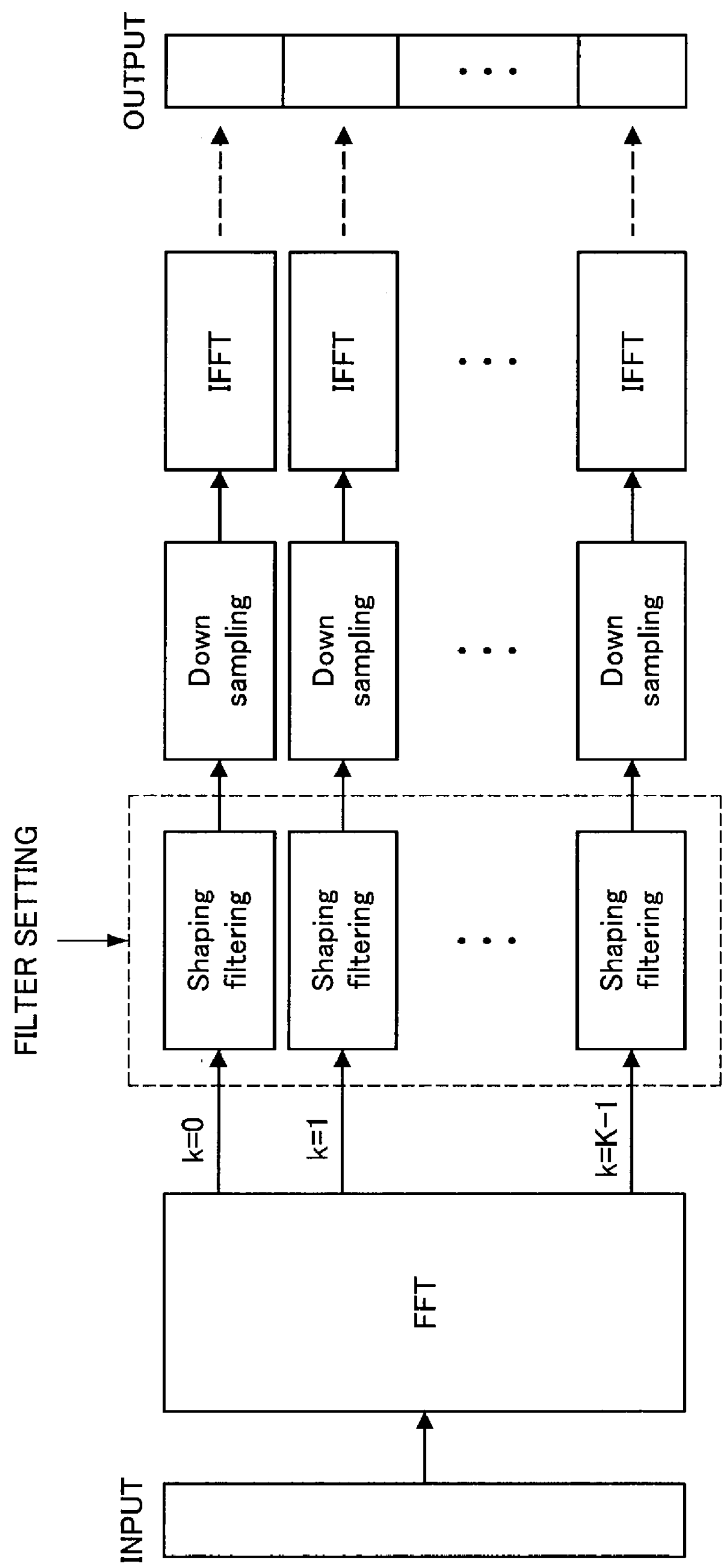
FIG. 17 is an explanatory diagram for describing a technical feature related to the reception process according to the present embodiment.

With reference to FIGS. 16 and 17, the following describes a reception process that is performed in the framework of the frequency domain GFDM, and entails GFDM demodulation.

FIG. 16 is a block diagram illustrating a configuration example of a reception apparatus (i.e., terminal apparatus 200). The reception apparatus performs signal processing on a signal received by an antenna with an analog FE, and performs GFDM demodulation. In a GFDM demodulator, the reception apparatus performs a process for extracting the original data from the received symbol. To this end, the GFDM demodulator may be a circuit that multiplies a conjugate transpose matrix $A^H$ of A which is matching filter reception for the transformation matrix A of the GFDM used for transmission, a circuit that multiplies an inverse matrix A-1 serving as zero force reception, a minimum mean square error (MMSE) reception circuit, or the like. Thereafter, the reception apparatus performs MIMO equalization and demapping of the transmission layer. Thereafter, the reception apparatus performs de-interleaving, de-scrambling, rate matching, and FEC decoding on each piece of reception data and outputs the resulting data.

Note that the analog FE may correspond to the wireless communication unit 220, the antenna may correspond to the antenna unit 210, and the other components may correspond to the reception processing unit 241. Of course, any other correspondence relation is acceptable.

Next, with reference to FIG. 17, the GFDM demodulator illustrated in FIG. 16 will be described in detail.

FIG. 17 is a block diagram illustrating an example of the configuration of a GFDM demodulator in the frequency domain GFDM. As illustrated in FIG. 17, the GFDM demodulator applies FFT to a received GFDM codeword for conversion into the frequency domain. Next, the GFDM demodulator applies a pulse shaping filter for each of K sub-bands similarly to the transmission process. The settings of the filter coefficient of the pulse shaping filter will be described below in detail. Next, the GFDM demodulator uses the same over sample ratio as that of up sampling on the transmission side to perform down sampling. The GFDM demodulator then outputs data coupled by applying IFFT to the K signals acquired in this way.

(2) Settings of Filter Coefficient

The terminal apparatus 200 (e.g., filter setting unit 243) according to the present embodiment sets a filter coefficient similarly to the transmission side. More specifically, the terminal apparatus 200 sets a filter coefficient applied to a signal that is subjected to GFDM modulation and transmitted, in accordance with different rules that depend on whether the number of subsymbols included in a unit resource is an even number or an odd number. The rule in the case of an odd number is a first rule similarly to the transmission side. The rule in the case of an even number is a second rule similarly to the transmission side. In this way, the terminal apparatus 200 performs filtering in accordance with the rules similar to those of the transmission side, and can then perform appropriately GFDM demodulation.

(3) Processing Flow

Figure 18:
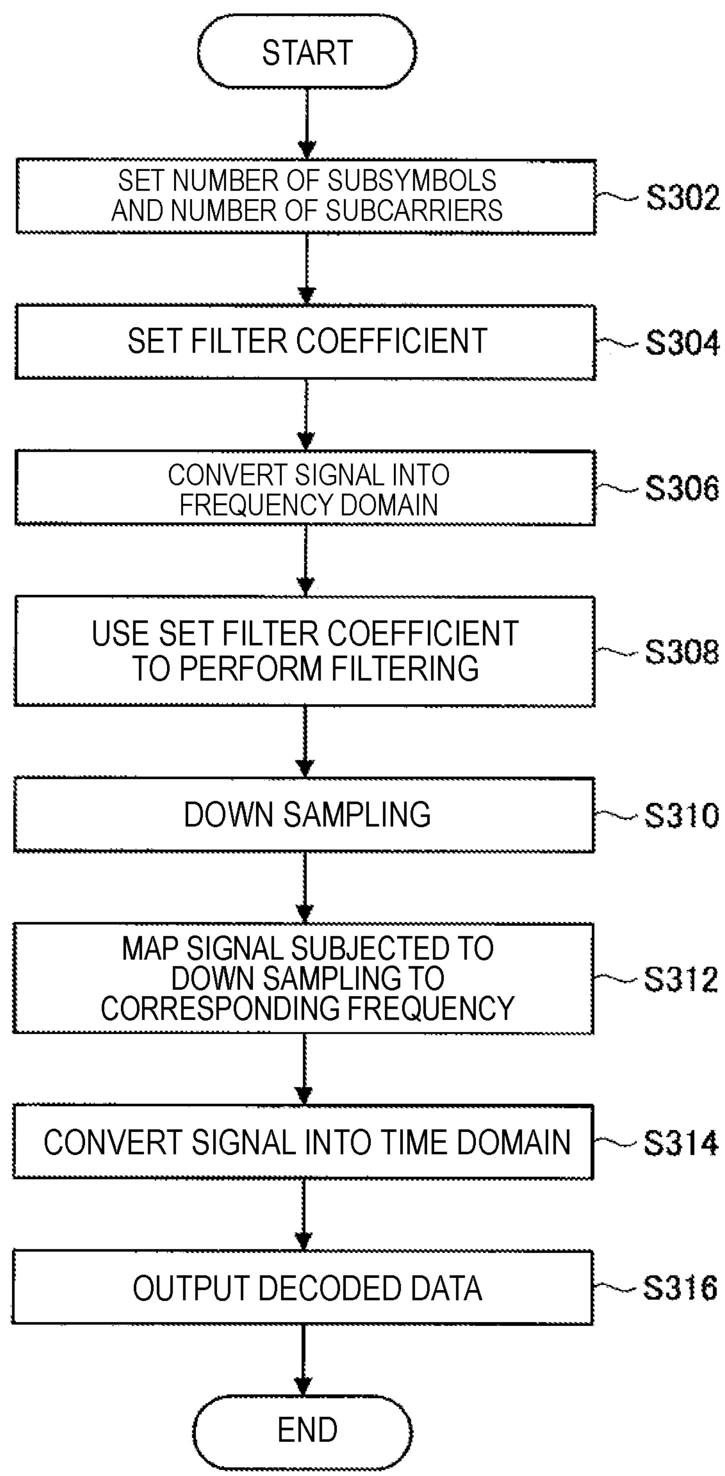
FIG. 18 is an explanatory diagram for describing a technical feature related to the reception process according to the present embodiment.

With reference to FIG. 18, the following describes the processing flow in the reception apparatus.

FIG. 18 is a flowchart illustrating an example of a flow of a reception process executed in the terminal apparatus 200 according to the present embodiment. As illustrated in FIG. 18, the reception processing unit 241 first sets the number of subsymbols and the number of subcarriers (step S302). This setting content is the same as that of the transmission side. For example, what is common in the system 1 is used, or a notification is issued from the transmission side. Next, the filter setting unit 243 sets a filter coefficient on the basis of the set number of subsymbols (step S304). Specifically, in the case where the number of subsymbols is an odd number, the filter setting unit 243 sets the filter coefficient sampled from the prototypical filter in accordance with the first rule. In the case where the number of subsymbols is an even number, the filter setting unit 243 sets the filter coefficient sampled from the prototypical filter in accordance with the second rule. Next, the reception processing unit 241 applies FFT to a reception signal for conversion into the frequency domain (step S306). Next, the reception processing unit 241 uses the filter coefficient set in step S304 to perform filtering the signal in the frequency domain which corresponds to each subcarrier (step S308). Next, the reception processing unit 241 performs down sampling on each signal subjected to the filtering (step S310), maps the signal subjected to the down sampling to the corresponding frequency, and multiplexes the frequency (step S312). Next, the reception processing unit 241 converts the signal whose frequency is multiplexed into a signal in the time domain according to IFFT (step S314), performs the respective processes from MIMO equalization to FEC decoding illustrated in FIG. 16, and outputs decoded data (step S316). After the above steps, the process ends.

5. SIMULATION RESULT

Figure 19:
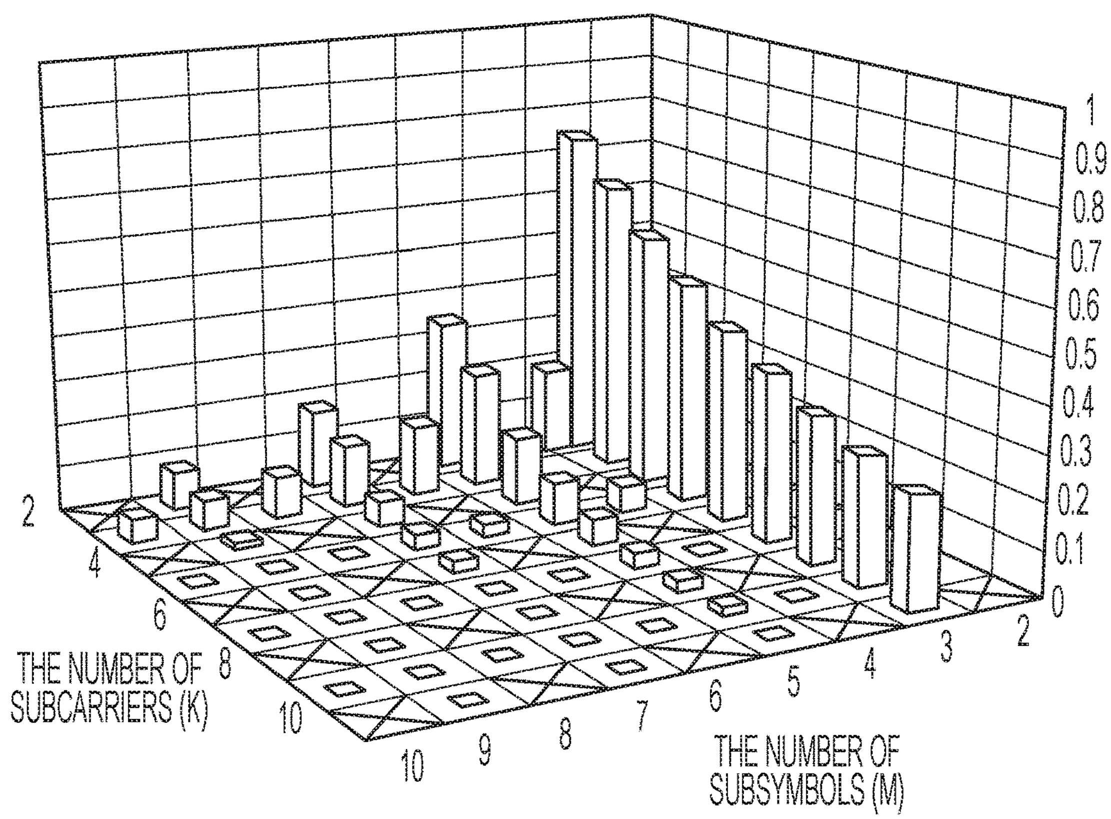
FIG. 19 is an explanatory diagram for describing a simulation result according to the embodiment.
Figure 20:
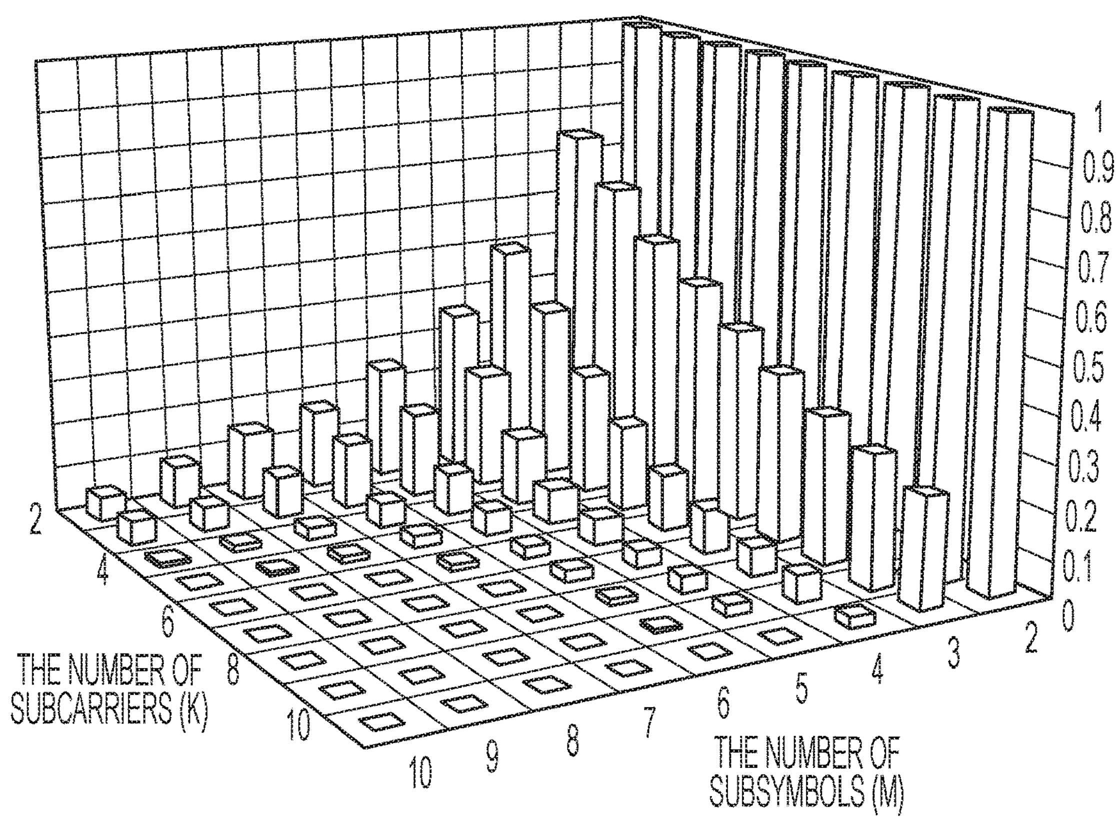
FIG. 20 is an explanatory diagram for describing a simulation result according to the embodiment.
Figure 21:
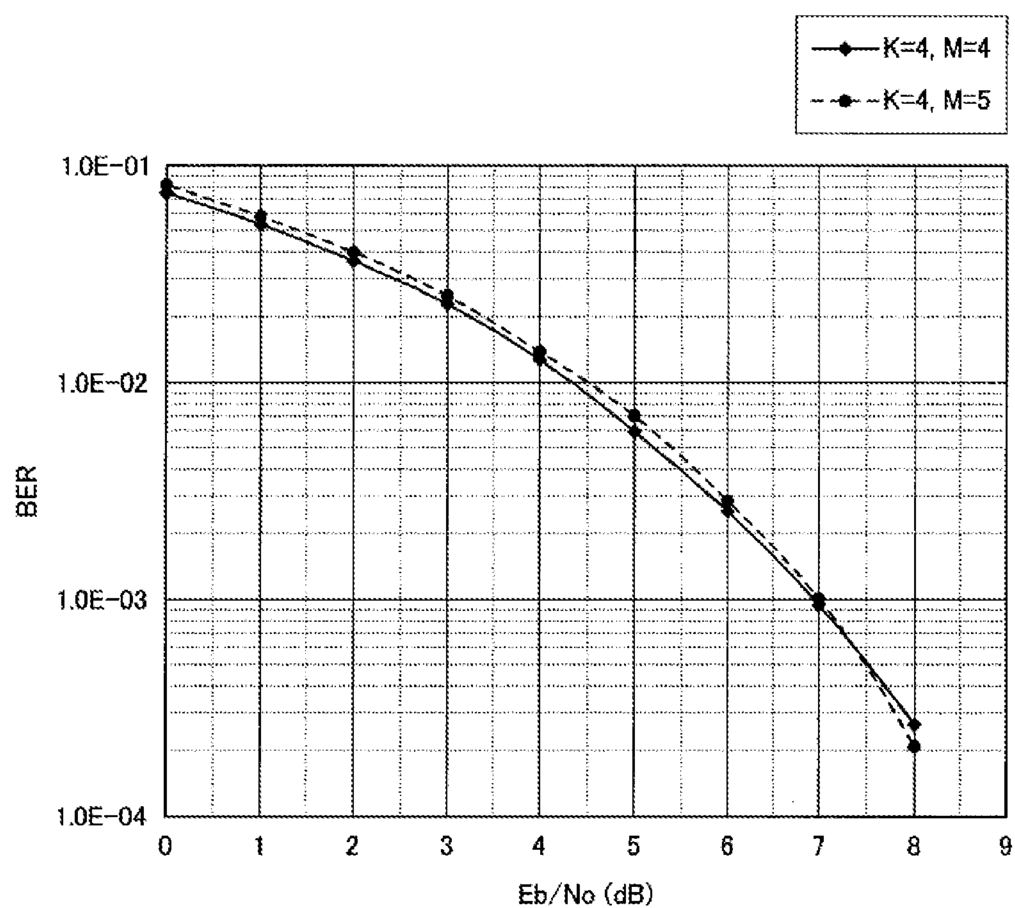
FIG. 21 is an explanatory diagram for describing a simulation result according to the embodiment.

With reference to FIGS. 19 to 21, the following describes an effect of GFDM modulation according to the present embodiment with reference to a simulation result related to the base station 100 and the terminal apparatus 200 according to the present embodiment.

FIG. 19 is a diagram illustrating the value of a matrix determinant det $(A'_F)$ of the matrix $A'_F$ in the case where the first rule is adopted whether the number of subsymbols is an even number or an odd number. FIG. 19 illustrates that the number M of subsymbols and the number K of subcarriers are each changed from 2 to 10. A place where the value of the matrix determinant is zero has a sign x.

In general, the irregularity of a matrix can be evaluated with the value of its matrix determinant. Specifically, in the case where the value of the matrix determinant is zero, the matrix is irregular. In the case where the value of the matrix determinant is not zero, the matrix is regular.

As illustrated in FIG. 19, in the case where both the number of subsymbols and the number of subcarriers are even numbers, it is shown that the value of the matrix determinant is zero, and there is no inverse matrix. Therefore, in the case where the first rule is adopted whether the number of subsymbols is an even number or an odd number, the reception side fails in demodulation.

FIG. 20 is a diagram illustrating the value of the matrix determinant det $(A'_F)$ of the matrix $A'_F$ in the case where the first rule is adopted in the case where the number of subsymbols is an odd number, and the second rule is adopted in the case where the number of subsymbols is an even number. FIG. 20 illustrates that the number M of subsymbols and the number K of subcarriers are each changed from 2 to 10.

As illustrated in FIG. 20, no place has any sign ×. That is, it is shown that the value of the matrix determinant is not zero in any combination of the number of subsymbols and the number of subcarriers, but the matrix $A'_F$ has an inverse matrix. In particular, even in the case where both the number of subsymbols and the number of subcarriers are even numbers where signs × are provided in FIG. 19, it is shown in FIG. 20 that the value of the matrix determinant is not zero, but the matrix $A'_F$ has an inverse matrix. That is, in the GFDM modulation according to the present embodiment, even in the case where the number of subsymbols is an even number, it is possible to make a success of demodulation on the reception side.

Moreover, the value of the matrix determinant in the case both the number of subsymbols and the number of subcarriers are even numbers is the mean value of the values of other matrix determinants adjacent in the direction of the number of subcarriers or the direction of the number of subsymbols. In other words, as the number of subsymbols increases, or the number of subsymbols increases, the value of the matrix determinant monotonically decreases with no fluctuation. This is evidence that the second rule has validity.

FIG. 21 is a diagram illustrating an example of a bit error rate of a signal for Eb/No to which the GFDM modulation according to the present embodiment is applied. For comparison, FIG. 21 illustrates an example of the case where both the number of subsymbols and the number of subcarriers are even numbers (the number M of subsymbols=4 and the number K of subcarriers=4), and an example of the case where the number of subsymbols is an odd number (the number M of subsymbols=5 and the number K of subcarriers=4). Note that the symbol mapping scheme is QPSK, the pulse shaping filter is an RC filter, the roll-off factor $\alpha$=0.5, and the over sample ratio L=2. In this way, even in the case where the number M of subsymbols is an even number, no considerable degradation is recognized in the bit error rate as compared with the case of an odd number. Accordingly, it is confirmed that demodulation is possible and a sufficient bit error rate is obtained.

6. APPLICATION EXAMPLES

The technology according to the present disclosure is applicable to various products. The base station 100 may also be implemented, for example, as any type of evolved Node B (eNB) such as macro eNBs and small eNBs. Small eNBs may be eNBs that cover smaller cells than the macrocells, such as pico eNBs, micro eNBs, or home (femto) eNBs. Instead, the base station 100 may be implemented as another type of base station such as Nodes B or base transceiver stations (BTSs). The base station 100 may include the main apparatus (which is also referred to as base station apparatus) that controls wireless communication and one or more remote radio heads (RRHs) that are disposed at different locations from that of the main apparatus. Also, various types of terminals described below may function as the base station 100 by temporarily or semi-permanently executing the functionality of the base station. Furthermore, at least some of structural elements of the base station 100 may be realized in a base station apparatus or a module for a base station apparatus.

Further, the terminal apparatus 200 may be implemented, for example, as a mobile terminal such as smartphones, tablet personal computers (PCs), notebook PCs, portable game terminals, portable/dongle mobile routers, and digital cameras, or an in-vehicle terminal such as car navigation apparatuses. Further, the terminal apparatus 200 may be implemented as a machine type communication (MTC) terminal for establishing a machine to machine (M2M) communication. Furthermore, at least some of structural elements of the terminal apparatus 200 may be implemented as a module (e.g., integrated circuit module including a single die) that is mounted on these terminals.

<6.1. Application Examples for Base Station>

First Application Example

Figure 22:
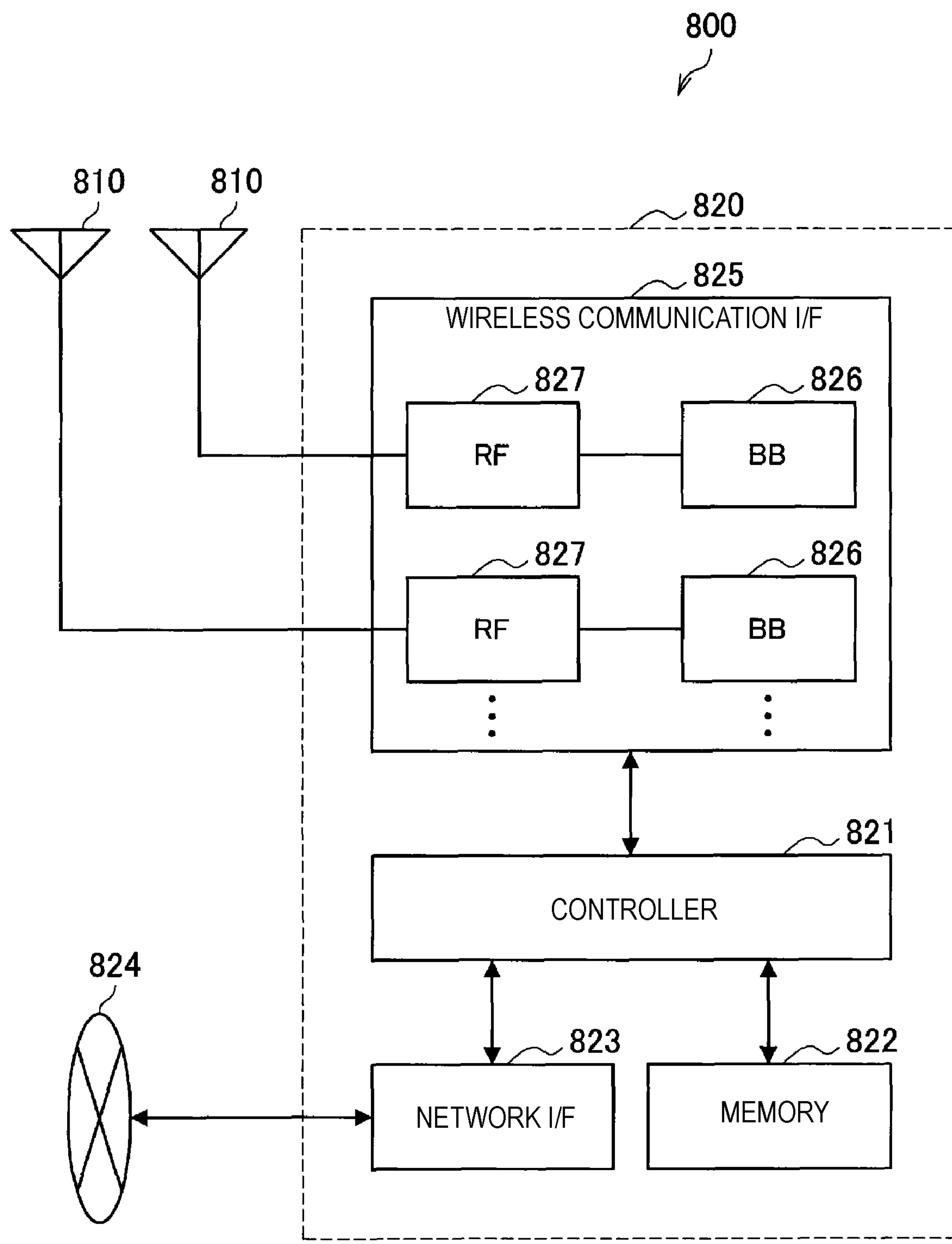
FIG. 22 is a block diagram illustrating a first example of a schematic configuration of an eNB.

FIG. 22 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 22, and the plurality of antennas 810 may, for example, correspond to a plurality of frequency bands used by the eNB 800. It should be noted that while FIG. 22 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of baseband processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a baseband (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 22, and the plurality of BB processors 826 may, for example, correspond to a plurality of frequency bands used by the eNB 800. Further, the wireless communication interface 825 may also include a plurality of the RF circuits 827, as illustrated in FIG. 22, and the plurality of RF circuits 827 may, for example, correspond to a plurality of antenna elements. Note that FIG. 22 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 22, one or more structural elements included in the processing unit 150 (the transmission processing unit 151 and/or the filter setting unit 153) described with reference to FIG. 5 may be implemented by the wireless communication interface 825. Alternatively, at least some of these structural elements may be implemented by the controller 821. As an example, a module which includes a part (for example, the BB processor 826) or all of the wireless communication interface 825 and/or the controller 821 may be mounted in the eNB 800, and the one or more structural elements may be implemented by the module. In this case, the module may store a program for causing the processor to function as the one or more structural elements (i.e., a program for causing the processor to execute operations of the one or more structural elements)

and may execute the program. As another example, the program for causing the processor to function as the one or more structural elements may be installed in the eNB 800, and the wireless communication interface 825 (for example, the BB processor 826) and/or the controller 821 may execute the program. As described above, the eNB 800, the base station apparatus 820, or the module may be provided as an apparatus which includes the one or more structural elements, and the program for causing the processor to function as the one or more structural elements may be provided. In addition, a readable recording medium in which the program is recorded may be provided.

In addition, in the eNB 800 illustrated in FIG. 22, the wireless communication unit 120 described with reference to FIG. 5 may be implemented by the wireless communication interface 825 (for example, the RF circuit 827).

Moreover, the antenna unit 110 may be implemented by the antenna 810. In addition, the network communication unit 130 may be implemented by the controller 821 and/or the network interface 823. Further, the storage unit 140 may be implemented by the memory 822.

Second Application Example

Figure 23:
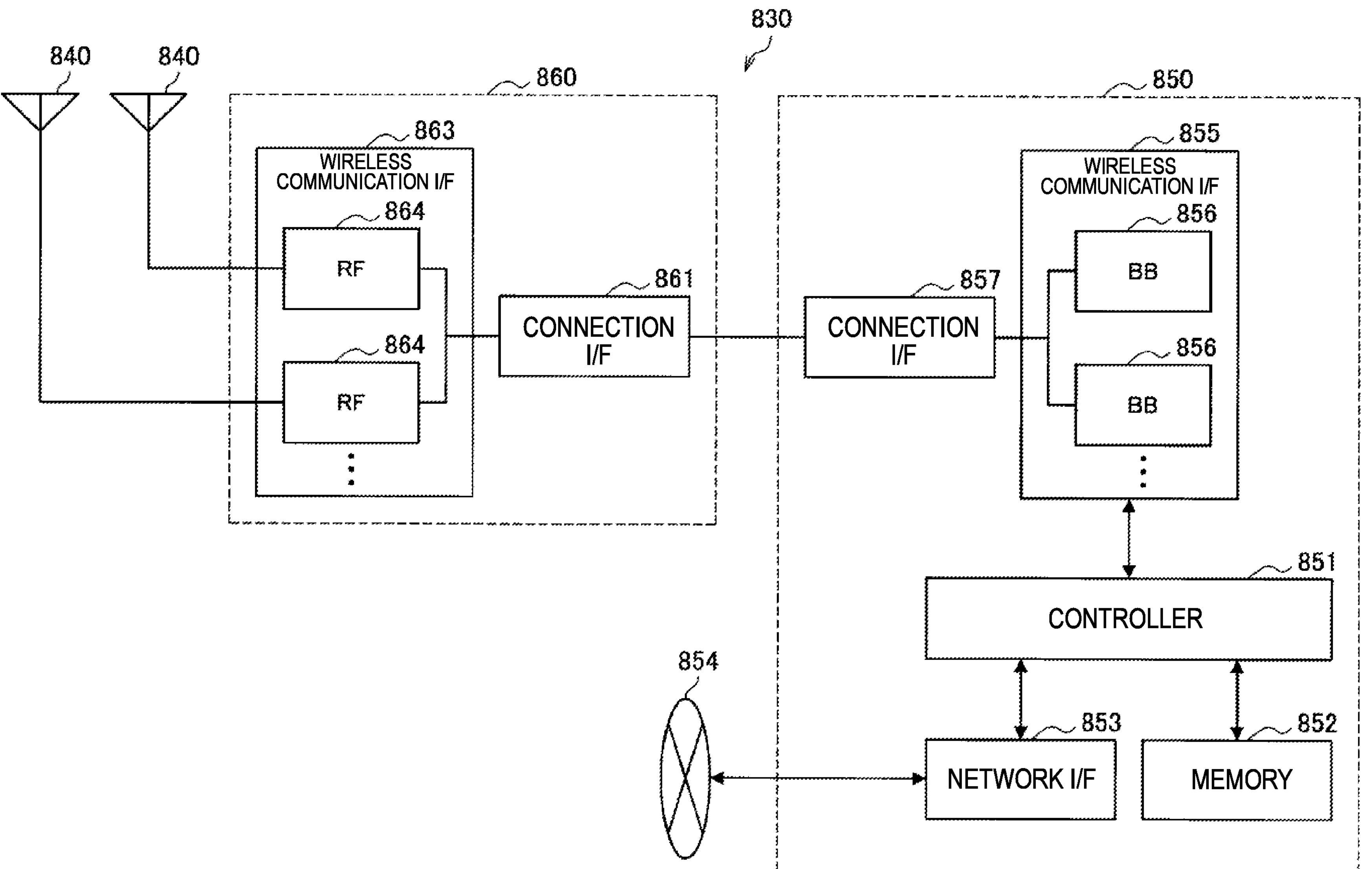
FIG. 23 is a block diagram illustrating a second example of a schematic configuration of an eNB.

FIG. 23 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 23, and the plurality of antennas 840 may, for example, correspond to a plurality of frequency bands used by the eNB 830. Note that FIG. 23 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 22.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 22 except that the BB processor 856 is connected to an RF circuit 864 of the RRH 860 via the connection interface 857. The wireless communication interface 855 may include a plurality of the BB processors 856, as illustrated in FIG. 23, and the plurality of BB processors 856 may, for example, correspond to a plurality of frequency bands used by the eNB 830. Note that FIG. 23 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 23, and the plurality of RF circuits 864 may, for example, correspond to a plurality of antenna elements. Note that FIG. 23 illustrates an example in which the wireless communication interface 863 includes the plurality of RF circuits 864, but the wireless communication interface 863 may include the single RF circuit 864.

In the eNB 830 illustrated in FIG. 23, one or more structural elements included in the processing unit 150 (the transmission processing unit 151 and/or the filter setting unit 153) described with reference to FIG. 5 may be implemented by the wireless communication interface 855 and/or the wireless communication interface 863. Alternatively, at least some of these structural elements may be implemented by the controller 851. As an example, a module which includes a part (for example, the BB processor 856) or all of the wireless communication interface 855 and/or the controller 851 may be mounted in the eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the wireless communication interface 855 (for example, the BB processor 856) and/or the controller 851 may execute the program. As described above, the eNB 830, the base station apparatus 850, or the module may be provided as an apparatus which includes the one or more structural elements, and the program for causing the processor to function as the one or more structural elements may be provided. In addition, a readable recording medium in which the program is recorded may be provided.

In addition, in the eNB 830 illustrated in FIG. 23, for example, the wireless communication unit 120 described with reference to FIG. 5 may be implemented by the wireless communication interface 863 (for example, the RF circuit 864). Moreover, the antenna unit 110 may be implemented by the antenna 840. In addition, the network communication unit 130 may be implemented by the controller 851 and/or the network interface 853. Further, the storage unit 140 may be implemented by the memory 852.

<6.2. Application Examples for Terminal Apparatus>

First Application Example

Figure 24:
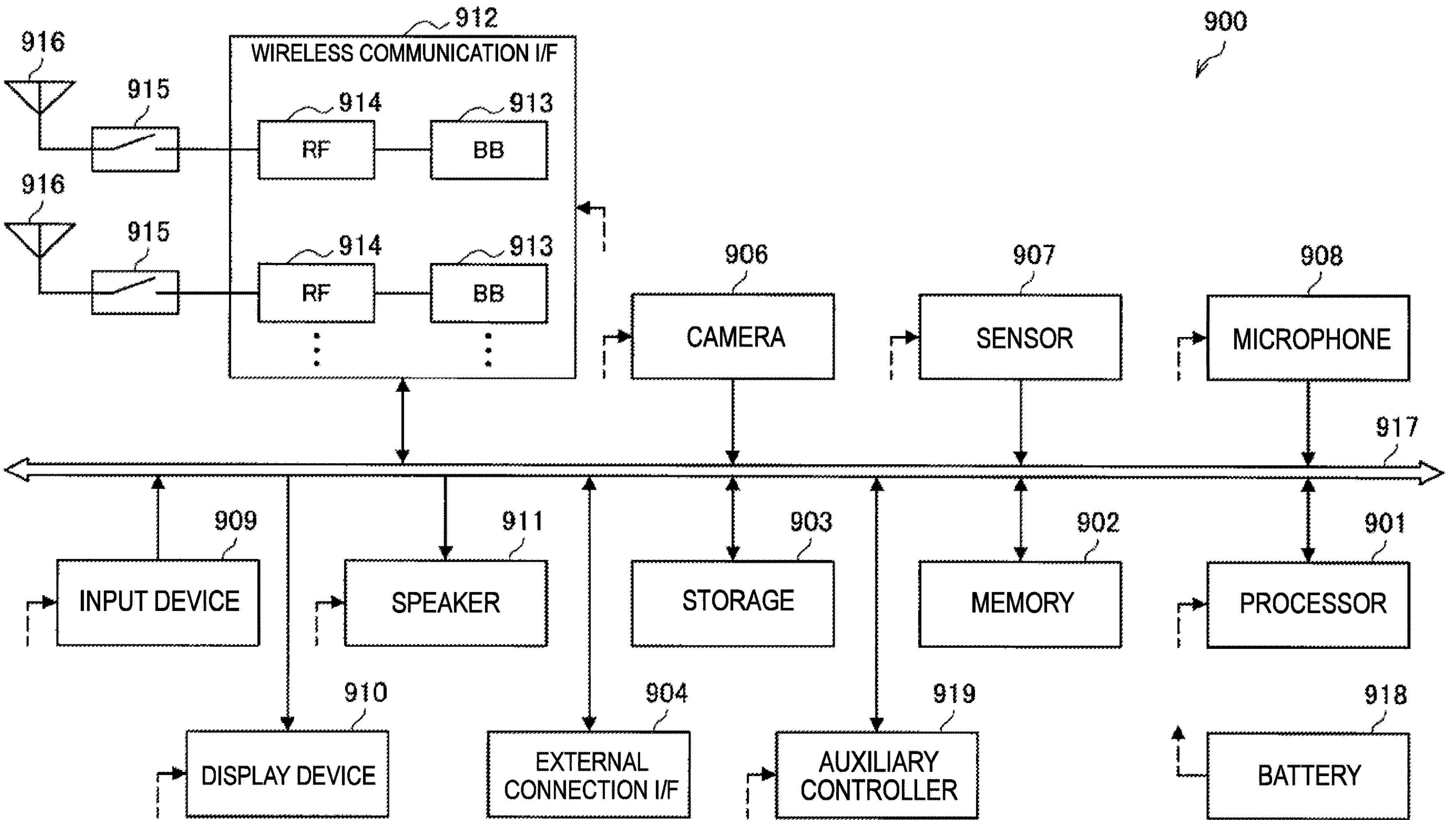
FIG. 24 is a block diagram illustrating an example of a schematic configuration of a smartphone.

FIG. 24 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 24. Note that FIG. 24 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 24. Note that FIG. 24 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 24 via a feeder line that is partially illustrated in the figure as a dashed line. The auxiliary controller 919, for example, operates a minimally necessary function of the smartphone 900 in a sleep mode.

In the smartphone 900 illustrated in FIG. 24, one or more structural elements included in the processing unit 240 (the reception processing unit 241 and/or the filter setting unit 243) described with reference to FIG. 6 may be implemented by the wireless communication interface 912. Alternatively, at least some of these structural elements may be implemented by the processor 901 or the auxiliary controller 919. As an example, a module which includes a part (for example, the BB processor 913) or all of the wireless communication interface 912, the processor 901, and/or the auxiliary controller 919 may be mounted in the smartphone 900, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the smartphone 900, and the wireless communication interface 912 (for example, the BB processor 913), the processor 901, and/or the auxiliary controller 919 may execute the program. As described above, the smartphone 900 or the module may be provided as an apparatus which includes the one or more structural elements, and the program for causing the processor to function as the one or more structural elements may be provided. In addition, a readable recording medium in which the program is recorded may be provided.

In addition, in the smartphone 900 illustrated in FIG. 24, for example, the wireless communication unit 220 described with reference to FIG. 6 may be implemented by the wireless communication interface 912 (for example, the RF circuit 914). Moreover, the antenna unit 210 may be implemented by the antenna 916. Further, the storage unit 230 may be implemented by the memory 902.

Second Application Example

Figure 25:
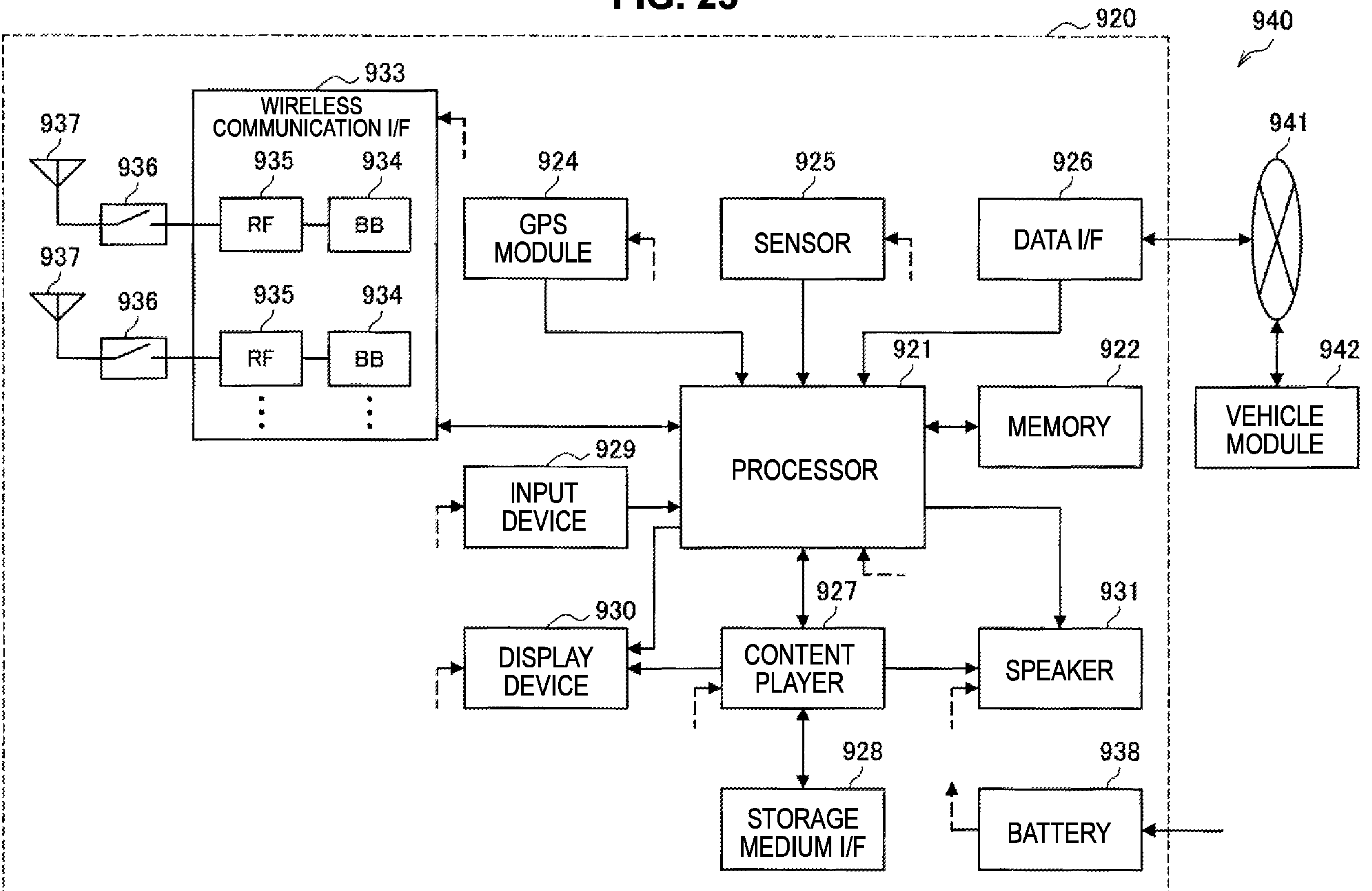
FIG. 25 is a block diagram illustrating an example of a schematic configuration of a car navigation apparatus.

FIG. 25 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 25. Note that FIG. 25 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 25. Note that FIG. 25 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 25 via a feeder line that is partially illustrated in the figure as a dashed line. Further, the battery 938 accumulates the electric power supplied from the vehicle.

In the car navigation apparatus 920 illustrated in FIG. 25, one or more structural elements included in the processing unit 240 (the reception processing unit 241 and/or the filter setting unit 243) described with reference to FIG. 6 may be implemented by the wireless communication interface 933. Alternatively, at least some of these structural elements may be implemented by the processor 921. As an example, a module which includes a part (for example, the BB processor 934) or all of the wireless communication interface 933 and/or the processor 921 may be mounted in the car navigation apparatus 920, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the car navigation apparatus 920, and the wireless communication interface 933 (for example, the BB processor 934) and/or the processor 921 may execute the program. As described above, the car navigation apparatus 920 or the module may be provided as an apparatus which includes the one or more structural elements, and the program for causing the processor to function as the one or more structural elements may be provided. In addition, a readable recording medium in which the program is recorded may be provided.

In addition, in the car navigation apparatus 920 illustrated in FIG. 25, for example, the wireless communication unit 220 described with reference to FIG. 6 may be implemented by the wireless communication interface 933 (for example, the RF circuit 935). Moreover, the antenna unit 210 may be implemented by the antenna 937. Further, the storage unit 230 may be implemented by the memory 922.

The technology of the present disclosure may also be realized as an in-vehicle system (or a vehicle) 940 including one or more blocks of the car navigation apparatus 920, the in-vehicle network 941, and a vehicle module 942. In other words, the in-vehicle system (or a vehicle) 940 may be provided as an apparatus which includes the reception processing unit 241 and the filter setting unit 243. The vehicle module 942 generates vehicle data such as vehicle speed, engine speed, and trouble information, and outputs the generated data to the in-vehicle network 941.

7. CONCLUSION

An embodiment of the present disclosure has been described above in detail with reference to FIGS. 1 to 25. As described above, the transmission apparatus according to the present embodiment variably sets at least any of the number of subcarriers or the number of subsymbols included in a unit resource including one or more subcarriers or one or more subsymbols, and sets a filter coefficient that is applied in accordance with different rules which depend on whether the number of subsymbols included in the unit resource is an even number or an odd number. This always makes a transformation matrix of GFDM regular without changing a frequency characteristic of the pulse shaping filter whether or not the number of subsymbols is an even number or an odd number. Therefore, the transformation matrix has an inverse matrix, so that zero-forcing demodulation is possible on the reception side. Moreover, providing the offset corresponding to ½ of sample frequency, and sampling a filter coefficient from the prototypical filter make it possible to prevent the bit error rate from considerably degrading even if the number of subsymbols is an even number. In this way, even if a restriction on resource setting which makes the number of subsymbols an odd number is lifted, it is possible to make a success of demodulation on the reception side.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, the example in which the base station 100 is the transmission apparatus, and the terminal apparatus 200 is the reception apparatus has been described, but the present technology is not limited to this example. For example, the terminal apparatus 200 may be the transmission apparatus, and the base station 100 may be the reception apparatus. In that case, the processing unit 240 has the functions of the transmission processing unit 151 and the filter setting unit 153, and the processing unit 150 has the functions of the reception processing unit 241 and the filter setting unit 243. In addition, if device to device (D2D) communication is considered, both the transmission apparatus and the reception apparatus may be the terminal apparatus 200.

Further, the processes described using the flowcharts in this specification need not be necessarily executed in the described order. Several process steps may be executed in parallel. Further, an additional process step may be employed, and some process steps may be omitted. The same applies to the order of various blocks of signal processing illustrated in FIGS. 7 and 16.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An apparatus including:

a processing unit configured to variably set at least any of a number of subcarriers or a number of subsymbols included in a unit resource including one or more subcarriers or one or more subsymbols, and set a filter coefficient that is applied in accordance with different rules which depend on whether the number of subsymbols included in the unit resource is an even number or an odd number.

(2)

The apparatus according to (1), in which the processing unit sets a value as the filter coefficient, the value being obtained by sampling a prototypical filter at a predetermined interval from a predetermined position on a frequency axis, and the predetermined position is different in accordance with whether the number of subsymbols included in the unit resource is an even number or an odd number.

(3)

The apparatus according to (2), in which the predetermined position in a case where the number of subsymbols included in the unit resource is an even number is a position obtained by adding an offset to a default position.

(4)

The apparatus according to (3), in which the offset corresponds to a value obtained by dividing subcarrier frequency by a multiple of the number of subsymbols.

(5)

The apparatus according to (3), in which the offset corresponds to ½ of sample frequency.

(6)

The apparatus according to any one of (2) to (5), in which the predetermined position in a case where the number of subsymbols included in the unit resource is an odd number is a default position.

(7)

The apparatus according to any one of (3) to (6), in which the default position is a cycle start position of sampling angular frequency.

(8)

The apparatus according to any one of (1) to (7), in which the processing unit applies up sampling in a frequency domain, and uses the filter coefficient to perform filtering after the up sampling.

(9)

The apparatus according to (8), in which an over sample ratio of the up sampling is 2.

(10)

An apparatus including:

a processing unit configured to set a filter coefficient in accordance with different rules, the filter coefficient being applied to a signal that is transmitted by variably setting at least any of a number of subcarriers or a number of subsymbols included in a unit resource including one or more subcarriers or one or more subsymbols, the different rules depending on whether the number of subsymbols included in the unit resource is an even number or an odd number.

(11)

A method including:

variably setting, by a processor, at least any of a number of subcarriers or a number of subsymbols included in a unit resource including one or more subcarriers or one or more subsymbols, and setting a filter coefficient that is applied in accordance with different rules which depend on whether the number of subsymbols included in the unit resource is an even number or an odd number.

(12)

A method including:

setting, by a processor, a filter coefficient in accordance with different rules, the filter coefficient being applied to a signal that is transmitted by variably setting at least any of a number of subcarriers or a number of subsymbols included in a unit resource including one or more subcarriers or one or more subsymbols, the different rules depending on whether the number of subsymbols included in the unit resource is an even number or an odd number.

(13)

A program for causing a computer to function as:

a processing unit configured to variably set at least any of a number of subcarriers or a number of subsymbols included in a unit resource including one or more subcarriers or one or more subsymbols, and set a filter coefficient that is applied in accordance with different rules which depend on whether the number of subsymbols included in the unit resource is an even number or an odd number.

(14)

A program for causing a computer to function as:

a processing unit configured to set a filter coefficient in accordance with different rules, the filter coefficient being applied to a signal that is transmitted by variably setting at least any of a number of subcarriers or a number of subsymbols included in a unit resource including one or more subcarriers or one or more subsymbols, the different rules depending on whether the number of subsymbols included in the unit resource is an even number or an odd number.

REFERENCE SIGNS LIST

1 system
100 base station
110 antenna unit
120 wireless communication unit
130 network communication unit
140 storage unit
150 processing unit
151 transmission processing unit
153 filter setting unit
200 terminal apparatus
210 antenna unit
220 wireless communication unit
230 storage unit
240 processing unit
241 reception processing unit
243 filter setting unit

The invention claimed is:

1. An apparatus comprising:

a processing unit configured to variably set at least any of a number of subcarriers or a number of subsymbols included in a unit resource including one or more subcarriers or one or more subsymbols, and set a filter coefficient that is applied in accordance with different rules which depend on whether the number of subsymbols included in the unit resource is an even number or an odd number.

2. The apparatus according to claim 1, wherein the processing unit sets a value as the filter coefficient, the value being obtained by sampling a prototypical filter at a predetermined interval from a predetermined position on a frequency axis, and the predetermined position is different in accordance with whether the number of subsymbols included in the unit resource is an even number or an odd number.

3. The apparatus according to claim 2, wherein the predetermined position in a case where the number of subsymbols included in the unit resource is an even number is a position obtained by adding an offset to a default position.

4. The apparatus according to claim 3, wherein the offset corresponds to a value obtained by dividing subcarrier frequency by a multiple of the number of subsymbols.

5. The apparatus according to claim 3, wherein the offset corresponds to ½ of sample frequency.

6. The apparatus according to claim 2, wherein the predetermined position in a case where the number of subsymbols included in the unit resource is an odd number is a default position.

7. The apparatus according to claim 3, wherein the default position is a cycle start position of sampling angular frequency.

8. The apparatus according to claim 1, wherein the processing unit applies up sampling in a frequency domain, and uses the filter coefficient to perform filtering after the up sampling.

9. The apparatus according to claim 8, wherein an over sample ratio of the up sampling is 2.

10. An apparatus comprising:

a processing unit configured to set a filter coefficient in accordance with different rules, the filter coefficient being applied to a signal that is transmitted by variably setting at least any of a number of subcarriers or a number of subsymbols included in a unit resource including one or more subcarriers or one or more subsymbols, the different rules depending on whether the number of subsymbols included in the unit resource is an even number or an odd number.

11. A method comprising:

variably setting, by a processor, at least any of a number of subcarriers or a number of subsymbols included in a unit resource including one or more subcarriers or one or more subsymbols, and setting a filter coefficient that is applied in accordance with different rules which depend on whether the number of subsymbols included in the unit resource is an even number or an odd number.

* * * * *